(12) United States Patent
Li et al.

(10) Patent No.: US 11,697,222 B2
(45) Date of Patent: Jul. 11, 2023

(54) ADDITIVELY MANUFACTURED STRUCTURE WITH REINFORCED ACCESS OPENING

(71) Applicant: General Electric Company, Schenectady, NY (US)

(72) Inventors: Xiaopeng Li, Niskayuna, NY (US); Biao Fang, Clifton Park, NY (US); Pascal Meyer, Burnt Hills, NY (US); Christopher James Kenny, Schoharie, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/515,608

(22) Filed: Nov. 1, 2021

(65) Prior Publication Data

US 2023/0135211 A1     May 4, 2023

(51) Int. Cl.
*B28B 1/00*            (2006.01)
*B33Y 10/00*        (2015.01)
(Continued)

(52) U.S. Cl.
CPC .............. *B28B 1/001* (2013.01); *B28B 1/008* (2013.01); *B28B 23/02* (2013.01); *B33Y 10/00* (2014.12); *B33Y 80/00* (2014.12)

(58) Field of Classification Search
None
See application file for complete search history.

(56) References Cited

U.S. PATENT DOCUMENTS 3,516,129 A    6/1970    Yoder
7,452,196 B2   11/2008   Khoshnevis
(Continued)

FOREIGN PATENT DOCUMENTS

CN        202023701 U     11/2011
CN        104328845 B      3/2017
(Continued)

OTHER PUBLICATIONS

APIS COR, Laying Down Framework and Walls, Apr. 6, 2016. (Weblink Only) https://www.youtube.com/watch?v=ViqzfPW6TFo.
(Continued)

*Primary Examiner* — Yung-Sheng M Tsui
*Assistant Examiner* — Melody Tsui
(74) *Attorney, Agent, or Firm* — Dority & Manning, P.A.

(57) ABSTRACT

A method and system of additively-manufacturing a structure having a reinforced access opening includes printing, via an additive printing device having at least one printer head, a portion of the structure adjacent to a support surface. The portion of the structure is printed of a cementitious material, and the printed portion of the structure defines an access opening for the structure. Moreover, the method includes providing a void of the cementitious material at a top boundary of the access opening, placing one or more reinforcement members in the void such that the one or more reinforcement members extend across the void, and continuing to print the printed portion of the structure around the void to build up the structure. Thus, the method also includes backfilling the void with a backfill material to incorporate the one or more reinforcement members within the void into the printed portion of the structure.

13 Claims, 16 Drawing Sheets

(51) Int. Cl.
   *B28B 23/02* (2006.01)
   *B33Y 80/00* (2015.01)

(56) References Cited

U.S. PATENT DOCUMENTS

| | | | |
|---|---|---|---|
| 7,641,461 B2 * | 1/2010 | Khoshnevis | E04G 21/0463 425/375 |
| 8,359,798 B2 | 1/2013 | Armbrecht et al. | |
| 8,778,479 B2 | 7/2014 | Bech | |
| 9,331,534 B2 | 5/2016 | Yost | |
| 10,260,480 B2 | 4/2019 | Beramendi Ortega et al. | |
| 10,513,833 B2 | 12/2019 | Phuly | |
| 10,543,617 B2 | 1/2020 | Grivetti et al. | |
| 2007/0181767 A1 | 8/2007 | Wobben | |
| 2012/0159785 A1 | 6/2012 | Pyles et al. | |
| 2013/0295338 A1 * | 11/2013 | Keating | B28B 7/346 425/375 |
| 2015/0300036 A1 | 10/2015 | Khoshnevis | |
| 2017/0016244 A1 | 1/2017 | Keller et al. | |
| 2017/0283297 A1 * | 10/2017 | Kulmagambetov | C03B 17/00 |
| 2017/0305034 A1 | 10/2017 | Grivetti et al. | |
| 2017/0365365 A1 * | 12/2017 | White | H05K 9/0001 |
| 2018/0093373 A1 | 4/2018 | Niederberger | |
| 2018/0171575 A1 | 6/2018 | Prusty et al. | |
| 2019/0226174 A1 | 7/2019 | Schuldt et al. | |
| 2020/0198318 A1 | 6/2020 | Ford et al. | |
| 2021/0324629 A1 * | 10/2021 | Brinton | E04B 1/80 |
| 2021/0379822 A1 * | 12/2021 | Ford | B33Y 80/00 |

FOREIGN PATENT DOCUMENTS

| | | |
|---|---|---|
| CN | 104453014 B | 4/2017 |
| EP | 2064393 B1 | 7/2012 |
| EP | 1711328 B1 | 3/2013 |
| GB | 2 525 400 A | 10/2015 |
| KR | 102075170 B1 | 2/2020 |
| WO | WO2016/055222 A1 | 4/2016 |
| WO | WO2017/092766 A1 | 6/2017 |
| WO | WO 2020/068113 A1 | 4/2020 |

OTHER PUBLICATIONS

Baduge et al., Improving Performance of Additive Manufactured (3D Printed) Concrete: A Review on Material Mix Design, Processing, Interlayer Bonding, and Reinforcing Methods, Science Direct, Structures, vol. 29, Feb. 2021, pp. 1597-1609. (Abstract Only) https://www.sciencedirect.com/science/article/abs/pii/S2352012420307839.

Bos et al., Experimental Exploration of Metal Cable as Reinforcement in 3D Printed Concrete, MDPI, Journals, Materials, vol. 10, Issue 11, 2017, 1314, 22 Pages. https:///doi.org/10.3390/ma10111314.

Cowan, The World's First Family to Live in a 3D-Printed Home, BBC News, Jul. 5, 2018, 12 Pgs. Retrieved on Sep. 1, 2020 from: https://www.bbc.com/news/technology-44709534.

FHWA, Chapter 8—Rebar Cages, Drilled Shafts: Construction Procedures by FHWA, PileBuck, Jun. 29, 2016, 11 Pages. http://www.pilebuck.com/drilled-shafts-construction-procedures-fhwa/chapter-8-rebar-cages/.

Gosselin et al., Large-Scale 3D Printing of Ultra-High Performance Concrete—A New Processing Route for Architects and Builders, Science Direct, Materials & Design, vol. 100, Jun. 15, 2016, pp. 102-109. (Abstract Only—3 pages) https://doi.org/10.1016/j.matdes.2016.03.097.

Hoffmann et al., Automation in the Construction of a 3D-Printed Concrete Wall with the Use of a Lintel Gripper, 13-01800, Journal List, Materials (Basel), vol. 13, No. 8, 2020, 15 Pages. https://www.ncbi.nlm.nih.gov/pmc/articles/PMC7215518/pdf/materials-13-01800.pdf.

Irving, 3D Printed Reinforced Concrete Bridge Opens in the Netherlands, New Atlas, Architecture, Oct. 17, 2017, 8 Pages. https://newatlas.com/3d-printed-concrete-bridge/51796/.

Kloft et al., Reinforcement Strategies for 3D-Concrete-Printing, Civil Engineering Design, vol. 2, Issue 4, Aug. 2020, pp. 131-139. https://onlinelibrary.wiley.com/doi/full/10.1002/cend.202000022.

Marchment et al., Mesh Reinforcing Method for 3D Concrete Printing, Science Direct, Automation in Construction, vol. 109, Jan. 2020, 3 Pages. (Abstract Only) https://www.sciencedirect.com/science/article/abs/pii/S0926580519306132.

Marijnissen et al, 3D Concrete Printing in Architecture: A research on the potential benefits of 3D Concrete Printing in Architecture, Material Studies—Methodologies, vol. 2—eCAADe 35, pp. 299-308. http://papers.cumincad.org/data/works/att/ecaade2017_087.pdf.

Mechtcherine et al., 3D-Printed Steel Reinforcement for Digital Concrete Construction—Manufacture, Mechanical Properties and Bond Behaviour, ScienceDirect, Construction and Building Materials, vol. 179, No. 10, Aug. 10, 2018, pp. 125-137. (Abstract Only) https://doi.org/10.1016/j.conbuildmat.2018.05.202.

Molitch-Hou, 400-Square-Meter Villa 3D Printed Onsite in Just 45 Days, Engineering.com, 3D Printing, Jun. 2016. Weblink Only https://www.engineering.com/3DPrinting/3DPrintingArticles/ArticleID/12415/400-Square-Meter-Villa-3D-Printed-Onsite-in-Just-45-Days.

Zarelyan et al., Effects of Interlocking on Interlayer Adhesion and Strength of Structures in 3D Printing of Concrete, Automation in Construction, vol. 83, Nov. 2017, pp. 212- 221. https://www.researchgate.net/publications/319162312_Effects_of_interlocking_on_interlayer_adhesion_and_strength_of_structures_in_3D_printing_of_concrete.

EP Search Report for application No. 22201619.9, dated Mar. 27, 2023, 8 pages.

* cited by examiner

ADDITIVELY MANUFACTURED STRUCTURE WITH REINFORCED ACCESS OPENING

FEDERALLY SPONSORED RESEARCH

This invention was made with government support under contract number DE-EE0009059 awarded by the United States (U.S.) Department of Energy. The U.S. government may have certain rights in the invention.

FIELD

The present disclosure relates in general to additively manufactured structures, and more particularly to an additively-manufactured wind turbine tower structure having a reinforced access opening and method of making same.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The wind turbine tower is generally constructed of steel tubes, pre-fabricated concrete sections, or combinations thereof. Further, the tubes and/or concrete sections are typically formed off-site, shipped on-site, and then arranged together to erect the tower. For example, one manufacturing method includes forming pre-cast concrete rings, shipping the rings to the site, arranging the rings atop one another, and then securing the rings together. As wind turbines continue to grow in size, however, conventional manufacturing methods are limited by transportation regulations that prohibit shipping of tower sections having a diameter greater than about four to five meters. Thus, certain tower manufacturing methods include forming a plurality of arc segments and securing the segments together on site to form the diameter of the tower, e.g., via bolting and/or welding. Such methods, however, require extensive labor and can be time-consuming.

In view of the foregoing, the art is continually seeking improved methods for manufacturing wind turbine towers. For example, more recently, progress has been made in the construction of wind turbine towers, at least in part, using additive printing techniques. Such methods allow for the tower structures to be erected on site and also allow the structures to be built to taller heights.

However, during construction of existing towers, it may be desirable to include a tower portion having an access opening, such as a pre-fabricated door or a section of a foundation, in the structure. However, additional reinforcement must also be included around such access opening as the structure is being built. In addition, reinforcement placement can be difficult to automate since the reinforcements (e.g., rebar, tension cables, etc.) must be placed in various orientations around the access opening to properly reinforce the access opening.

Accordingly, the present disclosure is directed to an additively-manufactured structure having a reinforced access opening that addresses the aforementioned issues.

BRIEF DESCRIPTION

Aspects and advantages of the invention will be set forth in part in the following description, or may be obvious from the description, or may be learned through practice of the invention.

In one aspect, the present disclosure is directed to a method of additively-manufacturing a structure having a reinforced access opening. The method includes printing, via an additive printing device having at least one printer head, a portion of the structure adjacent to a support surface. The portion of the structure is printed of a cementitious material, and the printed portion of the structure defines an access opening. Moreover, the method includes providing a void of the cementitious material at a top boundary of the access opening, placing one or more reinforcement members in the void such that the one or more reinforcement members extend across the void, and continuing to print the printed portion of the structure around the void to build up the structure. Thus, the method also includes backfilling the void with a backfill material to incorporate the one or more reinforcement members within the void into the printed portion of the structure.

In another aspect, the present disclosure is directed to structure including a support surface and a printed portion formed from a cementitious material. The printed portion of the structure is adjacent to the support surface and comprises a reinforced access opening, which is achieved via a backfilled void. In particular, the printed portion comprises a pre-fabricated door assembly to define, at least in part, the access opening. The reinforced access opening is achieved via a backfilled void at a top boundary of the access opening. The backfilled void includes backfilled cementitious material and one or more reinforcement members embedded within the backfilled cementitious material and extending across the backfilled void such that the one or more reinforcement members are incorporated into the printed portion of the structure. As such, the structure includes a reinforced access opening and a backfilled void.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
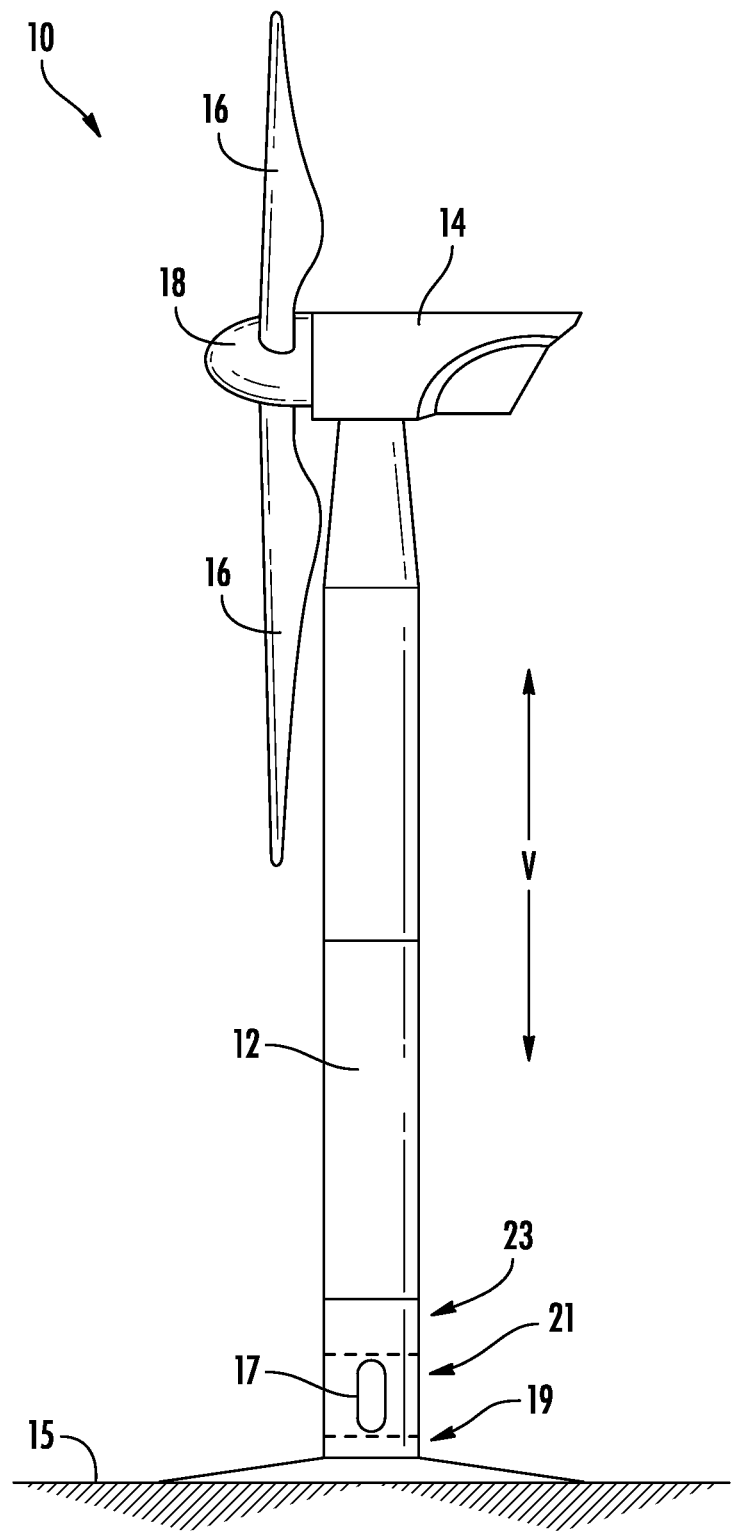
FIG. 1 illustrates a perspective view of one embodiment of an additively-manufactured structure according to the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to an additively-manufactured structure, such as a tower structure or a tower segment (with emphasis on the section of a tower segment adjacent to an interface between two or more tower segments, for example), having a reinforced access opening(s) and methods for manufacturing same using automated deposition of cementitious materials and/or other construction materials via technologies such as additive manufacturing, 3-D printing, spray deposition, extrusion additive manufacturing, concrete printing, automated fiber deposition, as well as other techniques that utilize computer numerical control and multiple degrees of freedom to deposit material. More specifically, methods of the present disclosure include using an automated additive printing device to print a tower structure, while also incorporating a pre-fabricated component (such as a door frame), or while using formwork or a cast component, to yield the reinforced access opening for the printed tower structure.

For example, in an embodiment, the tower structures of the present disclosure may include a pre-fabricated door assembly or a pre-fabricated foundation assembly and a backfilled void. The pre-fabricated component is constructed of a composite material reinforced with a plurality of reinforcement members, with portions of the reinforcement members protruding from the composite material. In particular, the reinforcement members around the pre-fabricated component are purposely left extending beyond the component and into the surrounding printed or print-poured section of the broader tower structure being built. Similarly, the backfilled void is situated adjacent to the pre-fabricated component and includes backfill material reinforced with one or more reinforcement members embedded within the backfill material and extending across the backfilled void and protruding therefrom. The backfill material may include any suitable workable paste that is configured to bind together after curing to form a structure. Suitable cementitious materials include, for example, concrete, pitch resin, asphalt, geopolymers, polymers, cement, mortar, cementitious compositions, or similar materials or compositions.

Accordingly, in an embodiment, the additive printing device is configured to: (1) print cementitious material to build up the tower structure layer by layer around the pre-fabricated component or the formwork; (2) in doing so, leaving a void to be backfilled; and (3) then subsequently backfilling the void after the reinforcement member(s) are placed into/through the void. As such, the portions of the reinforcement members protruding from the composite material, and the portions of the reinforcement members extending across the backfilled void reinforce the cementitious material around the access opening. Alternatively, the pre-fabricated component, for example, a pre-fabricated door assembly, or formwork may be positioned and installed about the access opening after at least a portion of the void is backfilled.

In another embodiment, manufacturing the tower structure may include positioning formwork to define the access opening and/or the backfilled void before, during, or after printing the portion of the tower structure around the access opening and/or the void is constructed, built up, or printed. As described herein, the formwork may include temporary or permanent molds into which the cementitious material and/or the backfill material is deposited. Further, the formwork may be supported by falsework. The falsework may include temporary structures commonly used in construction to support permanent structure(s) until construction has sufficiently progressed for the permanent structure(s) to be supported/self-supporting. In particular, in certain embodiments, pillars act as falsework to support stackable formwork to facilitate near continuous production of the backfilled void. In other embodiments, the formwork may be printed and take the form of a cast or shell for receiving cementitious material and/or backfill material.

For example, in an embodiment, manufacturing the tower structure may include positioning a cast-like printed formwork (herein referred to as a "cast component") to define the access opening and/or the backfilled void before, during, or after printing the portion of the tower structure around the access opening and/or the void. The cast component may be left permanently embedded in the printed portion of the tower structure as the tower structure is built up, or the cast component may be printed in place, used, and removed from the printed portion of the tower structure as the tower structure is built up. In particular, in certain embodiments, the cast component includes a different cementitious material composition than the composition of the cementitious material to be introduced into the cast component or to be used for printing the remainder of the tower structure.

As used herein, the term "cast component" generally refers to a type of pre-fabricated component, and the term "pre-fabricated component" generally refers, but is not limited to: (1) cast components that are printed in situ during printing of the tower structure; (2) cast components that are pre-printed separately from the tower structure; (3) pre-fabricated door assemblies and pre-fabricated foundation assemblies; and (4) equivalent structures described in further detail herein.

Thus, the methods described herein provide many advantages not present in the prior art. For example, the additively-manufactured structures described herein may include the necessary reinforcement to strengthen the overall structure in the region of the access opening, thereby simplifying the process of reinforcement placement (which is relatively complex around the access opening). Thus, the overall load bearing capabilities of the additively-manufactured structure at and about the access opening can be improved. Moreover, the present disclosure may permit on-site printing of structures having any desirable size, thereby enabling the construction of large tower structures and wind turbines. Accordingly, the structures manufactured using methods of the present disclosure may be formed without requiring a tall crane. The methods of the present disclosure may also increase design flexibility, eliminate overall size restrictions, and permit the formation of structures having any desirable profile and cross-sectional shape. The additive printing device may also utilize any suitable number of variable width printer heads to decrease manufacturing time and/or to create gaps or voids during continuous printing, for example. Moreover, the present disclosure is configured to minimize cold joint formation and provide solutions to minimize the effects and influences of cold joints where such joints unavoidably might develop.

Referring now to the drawings, FIG. 1 illustrates a perspective view of one embodiment of an additively-manufactured structure of the present disclosure, specifically, a wind turbine 10. As shown, the wind turbine 10 includes a tower 12 extending from a foundation 15 or support surface with an access opening 17 and a nacelle 14 mounted atop the tower 12. A plurality of rotor blades 16 are mounted to a rotor hub 18, which is in turn connected to a main flange that turns a main rotor shaft. The wind turbine power generation and control components (not shown) are typically housed within the nacelle 14. Moreover, as shown, the tower 12 may also include a base portion 19 below the access opening 17. In an embodiment, the base portion 19 of the tower 12 below the access opening 17 may be manufactured differently than the portion 21 of the tower structure 12 surrounding and/or including the access opening 17. Similarly, the portion 23 of the tower structure 12 above the access opening may be manufactured differently than the base portion 19 and/or the portion 21.

The view of FIG. 1 is provided for illustrative purposes only to place the present invention in an exemplary field of use. It should be appreciated that the invention is not limited to any particular type of wind turbine configuration. In addition, the present invention is not limited to use with wind turbine towers but may be utilized in any application having concrete constructions and/or tall tower structures in addition to wind towers, including for example homes, bridges, tall towers, building construction, and other aspects of the concrete industry. Further, the methods described herein may also apply to manufacturing any similar structure that benefits from the advantages described herein.

Figure 2:
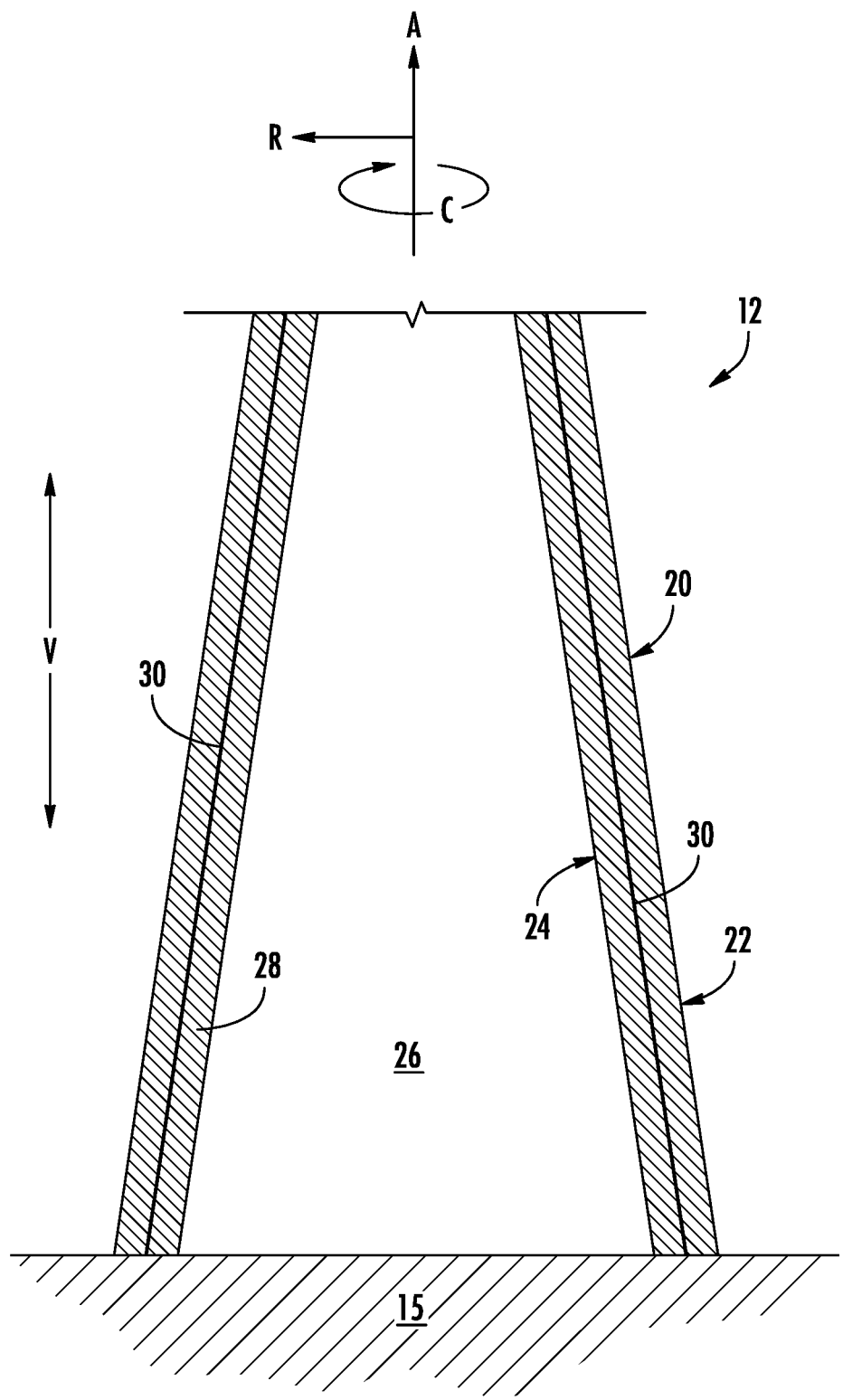
FIG. 2 illustrates a partial, cross-sectional view of one embodiment of a tower structure of a wind turbine according to the present disclosure.

Referring now to FIG. 2, the tower structure 12 of the wind turbine 10 of FIG. 1 is described in more detail according to an embodiment of the present disclosure. Specifically, FIG. 2 illustrates a partial, cross-sectional view of one embodiment of the tower structure 12 of the wind turbine 10 according to the present disclosure. As shown, the tower structure 12 defines a generally circumferential tower wall 20 having an outer surface 22 and an inner surface 24. Further, as shown, the circumferential tower wall 20 generally defines a hollow interior 26 that is commonly used to house various turbine components (e.g., a power converter, transformer, etc.). In addition, as will be described in more detail below, the tower structure 12 is formed using additive manufacturing.

Moreover, as shown, the tower structure 12 is formed of one or more cementitious materials 28 that is reinforced with one or more reinforcement members 30 (FIG. 2), such as elongated cables or wires, helical cables or wires, reinforcing bars (also referred to as rebar), mesh reinforcing fibers (metallic or polymeric), reinforcing metallic rings (circular, oval, spiral and others as may be relevant), and/or couplings. According to an embodiment, the cementitious material 28 may be provided through any suitable supply system 32 (see, e.g., FIG. 4). Further, as shown in the generalized simplified illustration of FIG. 2, the reinforcement members 30 may be embedded in the cementitious material 28 during the printing process, as described in more detail below. As used herein, the cementitious materials 28 may include any suitable workable paste that is configured to bind together after curing to form a structure. Suitable cementitious materials include, for example, concrete, pitch resin, asphalt, geopolymers, polymers, cement, mortar, cementitious compositions, or similar materials or compositions.

According to an embodiment of the present disclosure, an adhesive material (not shown), a cold joint primer (not shown), and/or steel/metal/alloy/composite frame(s) or end cap(s) in the form of C-shaped frames, for example, (not shown) may also be provided between one or more of the cementitious materials 28 and the foundation 15, the cementitious material 28 and reinforcement members 30, or multiple layers of the cementitious material 28 and reinforcement members 30. Thus, these materials may further supplement interlayer bonding between materials, facilitate integration or use of pre-fabricated components or formwork, or simply provide aesthetic benefits by capping off the rough edges of an additively-manufactured wall of cementitious material 28 in a tower structure 12, for example.

The adhesive material described herein may include, for example, cementitious material such as mortar, polymeric materials, and/or admixtures of cementitious material and polymeric material. Adhesive formulations that include cementitious material are referred to herein as "cementitious mortar." Cementitious mortar may include any cementitious material, which may be combined with fine aggregate. Cementitious mortar made using Portland cement and fine aggregate is sometimes referred to as "Portland cement mortar," or "OPC." Adhesive formulations that include an admixture of cementitious material and polymeric material are referred to herein as "polymeric mortar." Any cementitious material may be included in an admixture with a polymeric material, and optionally, fine aggregate. Adhesive formulations that include a polymeric material are referred to herein as "polymeric adhesive."

Exemplary polymeric materials that may be utilized in an adhesive formulation include may include any thermoplastic or thermosetting polymeric material, such as acrylic resins, polyepoxides, vinyl polymers (e.g., polyvinyl acetate (PVA), ethylene-vinyl acetate (EVA)), styrenes (e.g., styrene butadine), as well as copolymers or terpolymers thereof. Characteristics of exemplary polymeric materials are described in ASTM C1059/C1059M-13, Standard Specification for Latex Agents for Bonding Fresh to Hardened Concrete.

Figure 3:
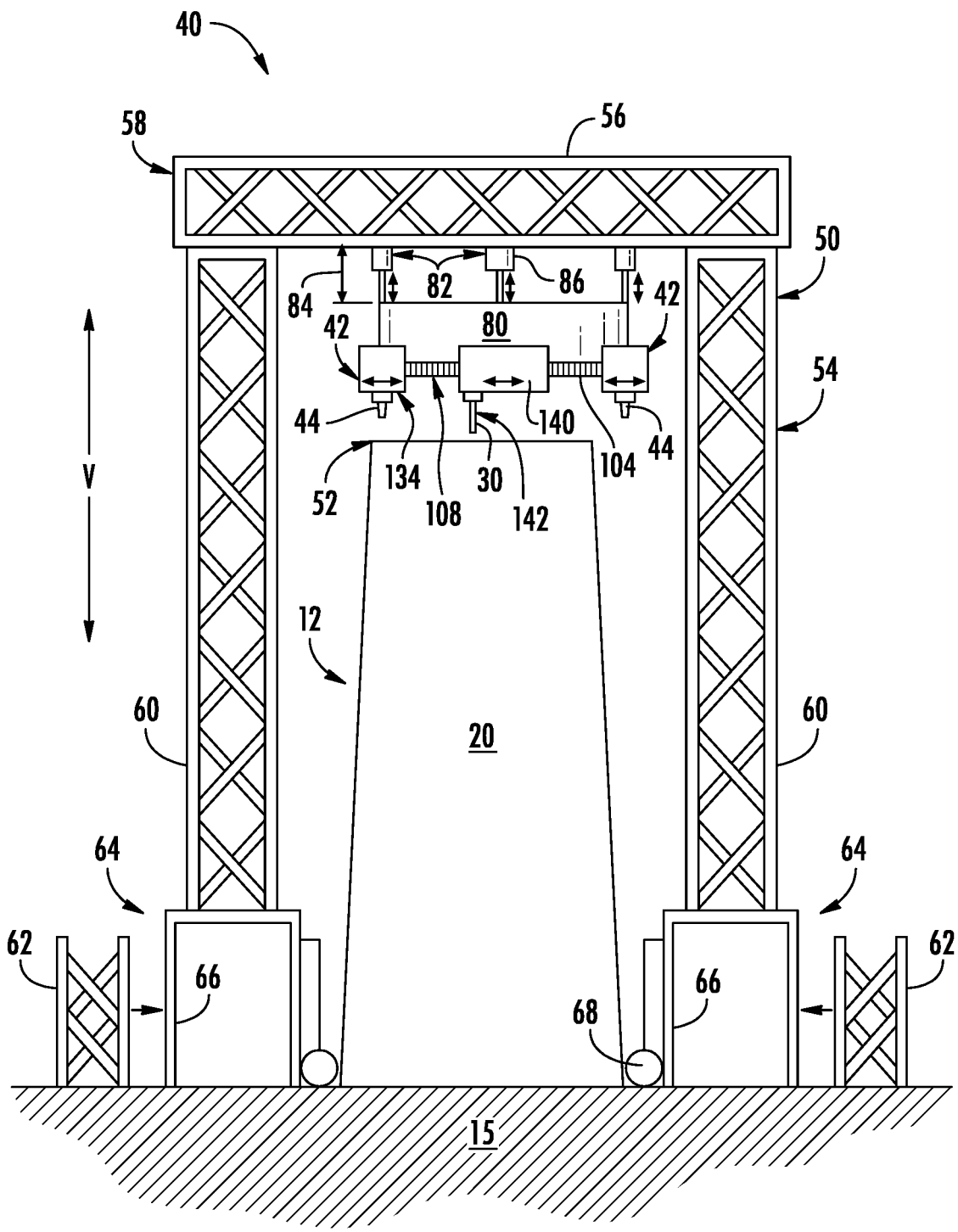
FIG. 3 illustrates a schematic view of an embodiment of an additive printing device being used to print the structures according to the present disclosure.
Figure 4:
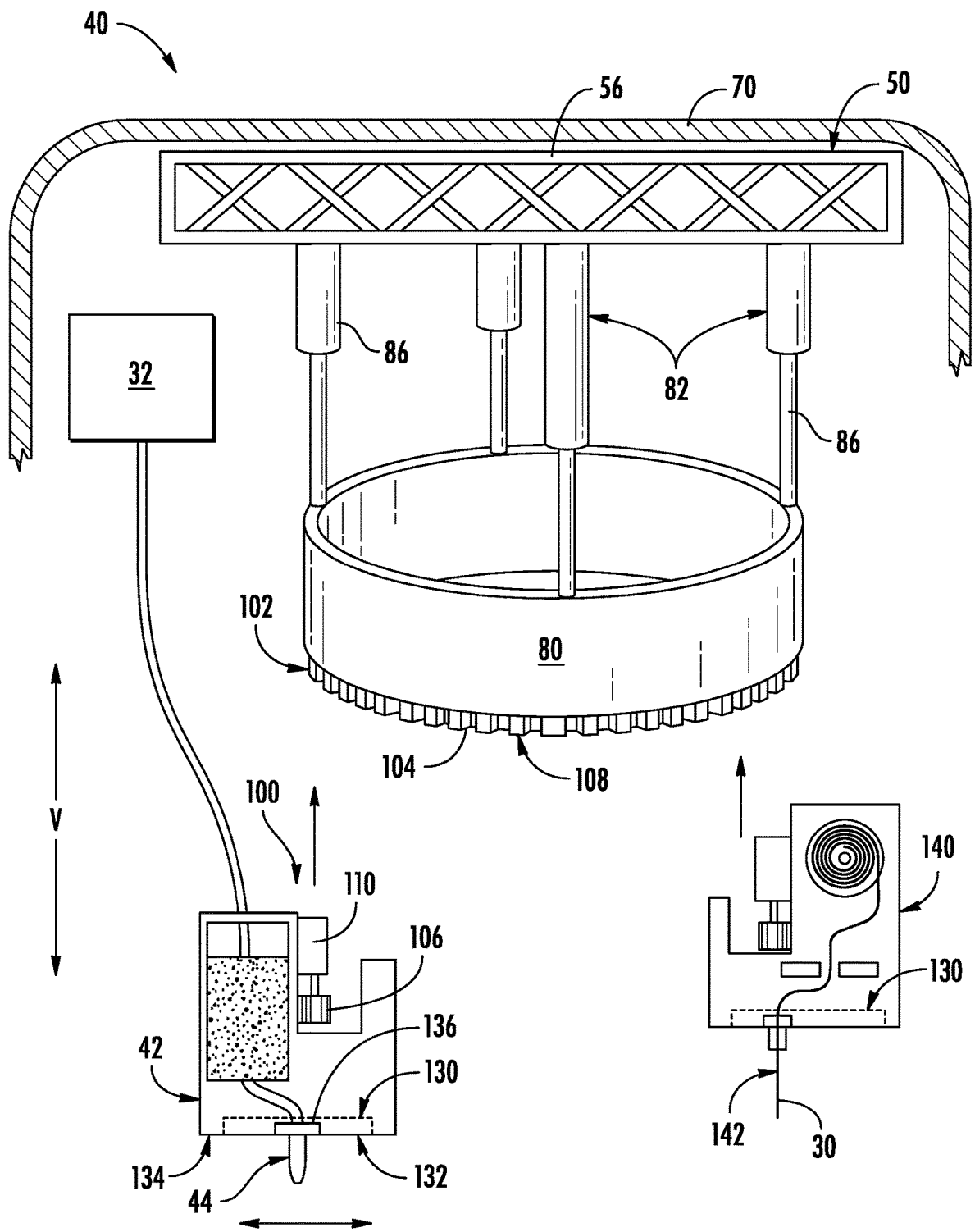
FIG. 4 illustrates a close-up view of certain components of the additive printing device of FIG. 3 according to the present disclosure.
Figure 5:
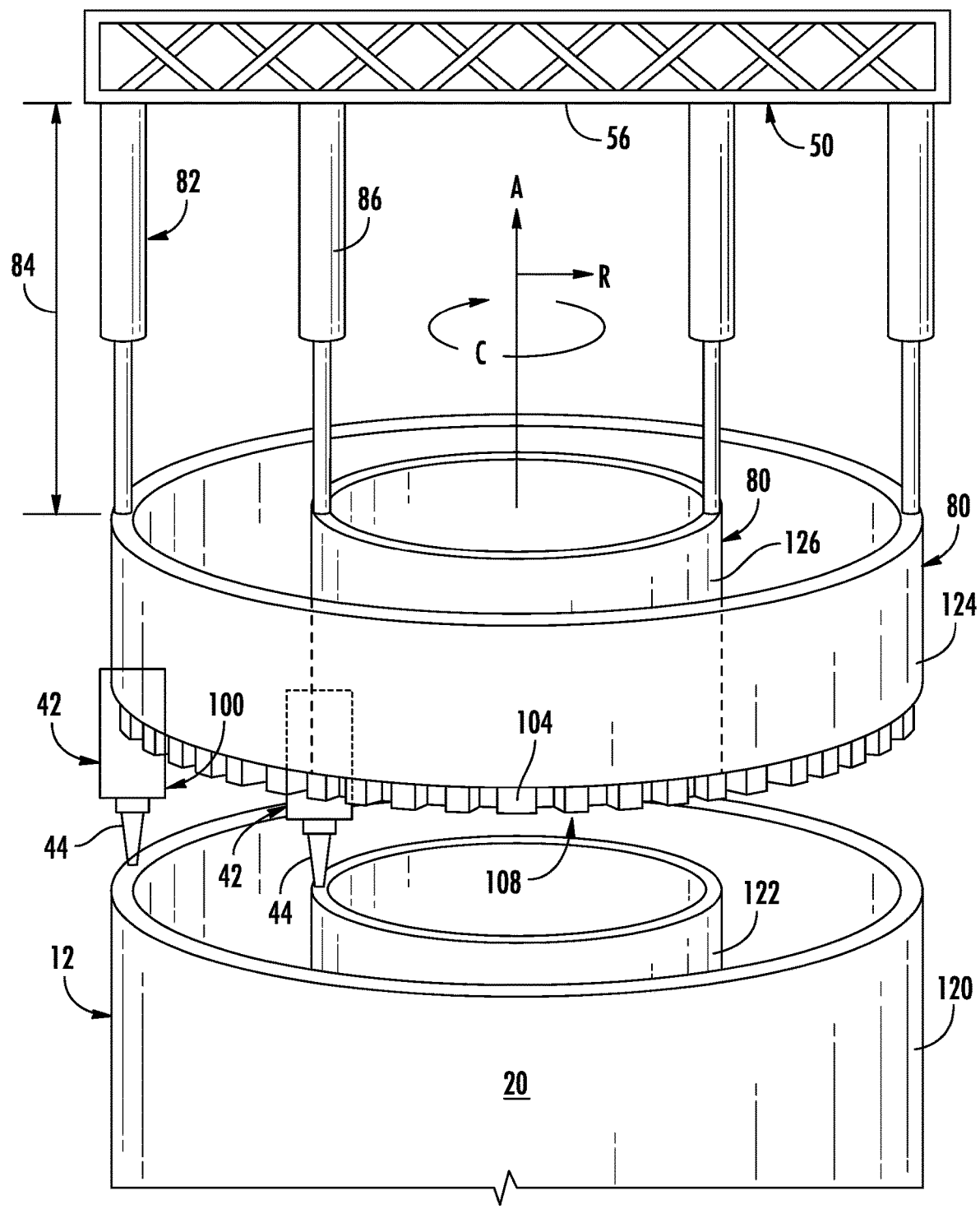
FIG. 5 illustrates another close-up view of an embodiment of certain components of an additive printing device according to the present disclosure.

Referring now generally to FIGS. 3 through 5, an additive printing device 40 is described according to an embodiment of the present disclosure. Notably, all or part of tower structure 12 may be printed, layer-by-layer, using the additive printing device 40, which may use any suitable mechanisms for depositing layers of additive material, such as concrete, to form tower structure 12. Additive manufacturing, as used herein, is generally understood to encompass processes used to synthesize three-dimensional objects in which successive layers of material are formed under computer control to create the objects. As such, objects of almost any size and/or shape can be produced from digital model data. It should further be understood that the additive manufacturing methods of the present disclosure may encompass three degrees of freedom, as well as more than three degrees of freedom such that the printing techniques are not limited to printing stacked two-dimensional layers but are also capable of printing curved and/or irregular shapes.

It should be further understood that the additive printing device 40 described herein generally refers to any suitable additive printing device 40 having one or more nozzles for depositing material (such as the cementitious material 28 or the backfill material which is not shown) onto a surface that is automatically controlled by a controller to form an object programmed within the computer (such as a CAD file). More specifically, as shown in FIG. 3 and described below, the additive printing device 40 includes one or more printer heads 42 having any suitable number of nozzles 44 and being independently movable to simultaneously print layers of the tower structure 12.

Referring still to FIGS. 3 through 5, the additive printing device 40 is described in more detail according to an embodiment of the present disclosure. As illustrated, the additive printing device 40 may include a vertical support structure 50 which is generally configured for suspending one or more of the printer heads 42 above tower structure 12 during the printing process. In this regard, the vertical support structure 50 may extend from the ground or from foundation 15 upwards substantially along a vertical direction V to a position at least partially above a top 52 of the tower structure 12 (e.g., and also above foundation 15 before the first layer is printed).

As illustrated, the vertical support structure 50 may include a plurality of support towers 54 and one or more gantry beams 56 that extend between at least two of the support towers 54. Although two support towers 54 and a single gantry beam 56 are illustrated in the FIGS. 3 through 5, it should be appreciated that any suitable number and position of support towers 54 may be used according to alternative embodiments. In addition, the support towers 54 and the gantry beams 56 are illustrated as being truss-like structures (e.g., similar to a tower crane), but could be formed in any other suitable manner or have any other configuration according to alternative embodiments.

In addition, although the vertical support structure 50 is illustrated as being positioned on the outside of the tower structure 12, it should be appreciated that according to alternative embodiments, the vertical support structure 50 may be positioned inside the tower structure 12. According to still other embodiments, the vertical support structure 50 may include the support towers 54 positioned both inside and outside of the tower structure 12. In addition, the additive printing device 40 may be suspended from the vertical support structure 50 using any other suitable system or mechanism.

Notably, during the additive printing process, the top 52 of tower structure 12 is built layer-by-layer, rising along the vertical direction V. Therefore, the vertical support structure 50 may be an expandable support structure which may be raised along with the height of tower structure 12. In this regard, the vertical support structure 50 may be formed from a plurality of stacked segments 60 which are positioned adjacent each other along the vertical direction V and joined to form the rigid vertical support structure 50. Thus, when the tower structure 12 approaches the top 58 of the vertical support structure 50, additional segments 62 may be added to stacked segments 60 to raise the overall height of vertical support structure 50.

Referring specifically to FIG. 3, additional segments 62 may be combined with stacked segments 60 to raise the vertical support structure 50 using a jacking system 64. In general, as shown, the jacking system 64 may be positioned proximate foundation 15 and is configured for raising the vertical support structure 50 (e.g., including the stacked segments 60 and the gantry beams 56) and inserting additional segments 62. Specifically, a separate jacking system 64 may be positioned at a bottom of each support tower 54.

According to an embodiment, the jacking system 64 may include a jacking frame 66 and a jacking mechanism 68 which are positioned at the bottom of stacked segments 60. The jacking mechanism 68 described herein may generally be any suitable hydraulically, pneumatically, or other mechanically actuated system for raising the vertical support structure 50. Accordingly, when additional segments 62 need to be added, a dedicated jacking mechanism 68 simultaneously raises each of the support towers 54 such that additional segments 62 may be inserted. Specifically, the jacking frame 66 may support the weight of the vertical support structure 50 as additional segments 62 are positioned below the lowermost stacked segments 60. Additional segments 62 are joined to stacked segments 60 using any suitable mechanical fasteners, welding, etc. This process may be repeated as needed to raise the total height of the vertical support structure 50.

In certain situations, it may be desirable to protect the tower structure 12 and components of the additive printing device 40 from the external environment in which they are being used. In such embodiments, the tower cover 70 may generally be any suitable material positioned around the vertical support structure 70. For example, the tower cover 70 may be a fabric-like material draped over or attached to the vertical support structure 50 (e.g., over the support towers 54 and/or the gantry beams 56).

As mentioned briefly above, the vertical support structure 50 is generally configured for supporting one or more of the printer heads 42 and or other modules which facilitate the formation of the tower structure 12. Referring specifically to FIGS. 3 through 5, the additive printing device 40 may further include one or more support members, such as support rings 80, that are suspended from the vertical support structure 50, or more specifically from gantry beams 56, above the tower structure 12. For example, as illustrated, the support ring 80 is mounted to the gantry beam 56 using a vertical positioning mechanism 82. In general, the vertical positioning mechanism 82 is configured for adjusting a height or vertical distance 84 measured between the gantry beam 56 and a top of support ring 80 along the vertical direction V. For example, the vertical positioning mechanism 82 may include one or more hydraulic actuators 86 extending between gantry beam 56 and support ring 80 for moving support ring 80 and printer heads 42 along the vertical direction V as tower structure 12 is built up layer-by-layer.

As illustrated, the hydraulic actuators 86 are configured for adjusting the vertical distance 84 to precisely position nozzles 44 of the printer heads 42 immediately above top 52 of the tower structure 12. In this manner, the additive printing process may be precisely controlled. However, it should be appreciated that according to alternative embodiments, the vertical motion of the printer heads 42 may be adjusted in any other suitable manner. For example, according to an embodiment, the support ring 80 may be rigidly fixed to the gantry beam 56 while the support ring 80 and/or the printer heads 42 are used to facilitate vertical motion to precisely position nozzles 44. For example, the printer heads 42 may be slidably mounted to the support ring 80 using a vertical rail and positioning mechanism to adjust the vertical position relative to the support ring 80 and the tower structure 12.

According to the illustrated embodiment, the printer head(s) 42 is movably coupled to the support ring 80 such that the nozzles 44 may deposit cementitious material 28 around a perimeter of tower structure 12 while the support ring 80 remains rotationally fixed relative to gantry beam 56. In this regard, for example, a drive mechanism 100 may operably couple the printer head(s) 42 to the support ring 80 such that printer head(s) 42 may be configured for moving around a perimeter 102 of the support ring 80 (e.g., about a circumferential direction C) while selectively depositing the cementitious material 28. One exemplary drive mechanism 100 is described below and illustrated in the figures, but it should be appreciated that other drive mechanisms are contemplated and within the scope of the present disclosure.

As best shown in FIG. 4, for example, the drive mechanism 100 may include a ring gear 104 that is positioned on the support ring 80 and a drive gear 106 that is rotatably mounted to printer head 42. Specifically, as illustrated, the ring gear 104 is defined on a bottom 108 of the support ring 80. Thus, when printer head(s) 42 42 is mounted on the bottom 108 of support ring 80, drive gear 106 engages ring gear 104. The drive mechanism 100 may further include a drive motor 110 that is mechanically coupled to the drive gear 106 for selectively rotating the drive gear 106 to move printer head(s) 42 around a perimeter 102 of the support ring 80. In this manner, the support ring 80 may remain stationary while printer head(s) 42 moves around the support ring 80 while depositing the cementitious material 28 to form a cross-sectional layer of tower structure 12.

Although the drive mechanism 100 is illustrated herein as a rack and pinion geared arrangement using drive gear 106 and ring gear 104, it should be appreciated that any other suitable drive mechanism 100 may be used according to alternative embodiments. For example, the drive mechanism 100 may include a magnetic drive system, a belt drive system, a frictional roller drive system, or any other mechanical coupling between printer head(s) 42 and support ring 80 which permits and facilitates selective motion between the two.

In addition, in an embodiment, the support ring 80 may generally have a diameter that is substantially equivalent to a diameter of the tower structure 12. However, it may be desirable to print the tower structure 12 having a non-fixed diameter or a tapered profile. In addition, as illustrated for example in FIG. 5, the tower structure 12 may include an outer tower wall 120 spaced apart along a radial direction R from an inner tower wall 122. For example, the outer tower wall 120 may be printed to define a mold for receiving poured concrete, e.g., to decrease printing time and total construction time.

Thus, as shown, the additive printing device 40 may include a plurality of concentric support rings 80 and printer heads 42 for simultaneously printing each of the outer tower wall 120 and the inner tower wall 122. Specifically, as illustrated, an outer support ring 124 may be positioned above the outer tower wall 120 and have a substantially equivalent diameter to the outer tower wall 120. Similarly, the inner support ring 126 may be positioned above the inner tower wall 122 and have a substantially equivalent diameter to the inner tower wall 122. It should be appreciated that as used herein, terms of approximation, such as "approximately," "substantially," or "about," refer to being within a ten percent margin of error. According to this embodiment, each of outer support ring 124 and inner support ring 126 may include dedicated printer heads 42 and/or other modules for facilitating the printing process of outer tower wall 120 and inner tower wall 122, respectively.

Referring again to FIG. 4, the printer head(s) 42 may include mechanisms for adjusting the position of nozzles 44 on printer head(s) 42. For example, printer head(s) 42 may include a radial adjustment mechanism 130 that is configured for moving print nozzle 44 along the radial direction R. Specifically, according to the illustrated embodiment, radial adjustment mechanism 130 includes a slide rail 132 mounted to a bottom 134 of printer head 42. The slide rail 132 extends substantially along the radial direction and is configured for slidably receiving the nozzle 44.

The radial adjustment mechanism 130 may further include an actuating mechanism 136 that moves print nozzle 44 along the radial direction R within the slide rail 132. For example, the actuating mechanism 136 may include any suitable actuator or positioning mechanism for moving nozzle 44 within the slide rail 132. In this regard, for example, the actuating mechanism 136 may include one or more of a plurality of linear actuators, servomotors, track conveyor systems, rack and pinion mechanisms, ball screw linear slides, etc.

Referring still to FIGS. 3 and 4, the additive printing device 40 may include any other suitable number of sub-systems or modules to facilitate and improved printing process or improved finishing of tower structure 12. For example, as best illustrated in FIG. 4, the additive printing device 40 may include a reinforcement module 140 which is movably coupled to the support ring 80 and is configured for embedding one or more support members 142 at least partially within tower structure 12. In this regard, for example, the reinforcement module 140 may be similar to the printer head(s) 42 in that engages the support ring 80 and may move around a perimeter 102 of the support ring 80 while depositing the support members 142.

For example, according to an embodiment, the support members 142 may be reinforcement bars (i.e., rebar), tensioning cables, or any other suitable structural support members, as explained briefly below. For example, as shown in FIG. 2, the reinforcement module 140 may embed one or more reinforcement members 30 at least partially within one or more of portions of the tower structure 12. In this regard, the reinforcement module 140 positions reinforcement members 30 at least partially within the tower structure 12. It should be understood that such reinforcement members 30 may extend along the entire height of the tower structure 12 (e.g., as shown in FIG. 2) or along only a portion of the tower height.

Similarly, referring still to FIGS. 3 and 4, the additive printing device 40 also may be configured to supply backfill material, for example, via a mechanism movably coupled to the support ring 80 and configured for depositing backfill material and/or any other material as described herein. In this regard, for example, such a mechanism may be similar to the printer head(s) 42 and/or reinforcement module 140 in that it engages the support ring 80 and may move around a perimeter 102 of the support ring 80 while depositing a backfill material 229 (see e.g., FIGS. 14, 18-21). For example, according to an embodiment, the backfill material 229 described herein may include any suitable workable paste that is configured to bind together after curing to form a structure. Suitable materials include, for example, concrete, pitch resin, asphalt, clay, cement, mortar, cementitious compositions, geopolymer materials, polymer materials, or similar materials or compositions.

According to an embodiment, as the tower structure 12 is being built up, the additive printing device 40 can alternate between depositing reinforcement members 30 using the reinforcement module 140, printing the cementitious material 28 using printer heads 42 and nozzles 44, and backfilling a void using the backfill module. Alternatively, as illustrated in FIGS. 3 and 4, the reinforcement module 140 may be positioned adjacent the printer heads 42 and configured for unwinding or unrolling the reinforcement members 30 or rebar into the print area prior to depositing cementitious material 28 such that the reinforcement members 30 becomes embedded within or printed over with cementitious material 28. Alternatively, the additive printing device 40 may include any other suitable features for compressing or embedding tensioning cable into cementitious material 28 before it has solidified or cured. In alternative embodiments, the additive printing device 40 is configured to eject the cementitious material 28 with short polymer and/or metallic fibers or rings as reinforcements to improve the structural strength of the tower structure 12.

Furthermore, the reinforcement members 30 may generally be configured for ensuring that the stresses in the cementitious material 28, e.g., concrete, may remain largely compressive. Thus, the reinforcement members 30 may be pretensioned in the cementitious material 28 and may be printed around the reinforcement members 30 or the printing process may define holes or voids throughout the tower structure 12 through which the reinforcement members 30 may be placed after curing or for backfilling, and thereafter post-tensioned. In addition, the reinforcement members 30 may be cables, tendons (e.g., external vertical pretensioned tendons), and/or subsequently grouted into place. In alternative embodiments, the additive printing device 40 may be configured to provide tension to the reinforcement members 30 during printing of the tower structure 12. In such embodiments, additive printing device 40 may vary a tension of the reinforcement members 30 as a function of a cross-section of the tower structure 12 during the printing process. Thus, such reinforcement members 30 are configured to manage tensile stresses of the tower structure 12.

In another embodiment, the tower structure 12 may include, for example, a plurality of reinforcing bars that form a metal mesh (not shown) arranged in a cylindrical configuration to correspond to the shape of the tower structure 12. Further, the cylindrical metal mesh can be embedded into the cementitious material 28 of the tower structure 12 before the material 28 cures and periodically along the height of the tower 12. In addition, the additive printing device 40 is configured to print the cementitious material 28 in a manner that accounts for the cure rate thereof such that the tower wall 20, as it is being formed, can bond to itself. In addition, the additive printing device 40 is configured to print the tower structure 12 in a manner such that it can withstand the weight of the wall 20 as the additively-formed cementitious material 28 can be weak during printing.

In addition, although the description herein refers to the tower structure 12 being printed from a single material, e.g., concrete, it should be appreciated that the tower structure 12 may be printed using any suitable material, even if different from other sections. In addition, the tower structure 12 may have any suitable cross sectional profile. In this regard, as illustrated, the tower structure 12 may be substantially cylindrical or have a circular cross section. However, according to still other embodiments, the tower structure 12 may be polygonal, elliptical, oval, square, teardrop, airfoil, or any other suitable shape. In addition, according to still another embodiment, the tower structure 12 may be tapered or vary in cross-sectional area depending on the vertical position along the tower structure 12.

Figure 6:
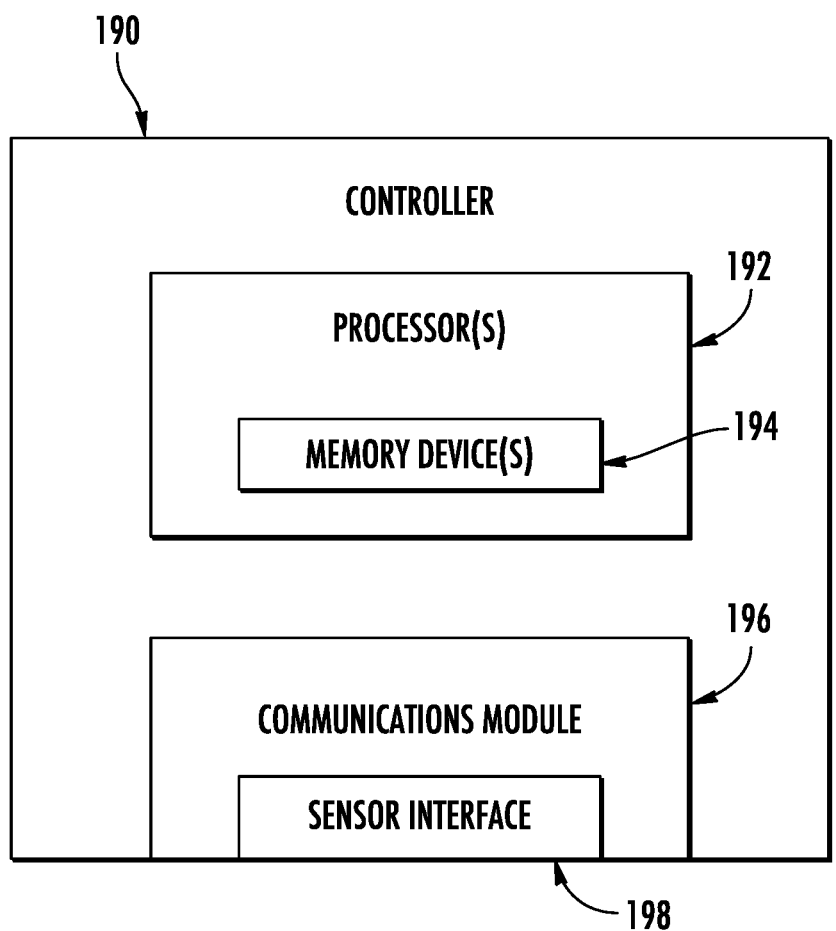
FIG. 6 illustrates a block diagram of one embodiment of a controller of an additive printing device according to the present disclosure.

Referring now to FIG. 6, a block diagram of an embodiment of a controller 190 of the additive printing device 40 is illustrated. As shown, the controller 190 may include one or more processor(s) 192 and associated memory device(s) 194 configured to perform a variety of computer-implemented functions (e.g., performing the methods, steps, calculations and the like and storing relevant data as disclosed herein). Additionally, the controller 190 may also include a communications module 196 to facilitate communications between the controller 190 and the various components of the additive printing device 40. Further, the communications module 196 may include a sensor interface 198 (e.g., one or more analog-to-digital converters) to permit signals transmitted from one or more sensors or feedback devices to be converted into signals that can be understood and processed by the processor(s) 192. It should be appreciated that these sensors and feedback devices may be communicatively coupled to the communications module 196 using any suitable means, e.g., via a wired or wireless connection using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 192 is also configured to compute advanced control algorithms and communicate to a variety of Ethernet or serial-based protocols (Modbus, OPC, CAN, etc.). Additionally, the memory device(s) 194 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 194 may generally be configured to store suitable computer-readable instructions that, when implemented by the processor(s) 192, configure the controller 190 to perform the various functions as described herein.

Figure 7:
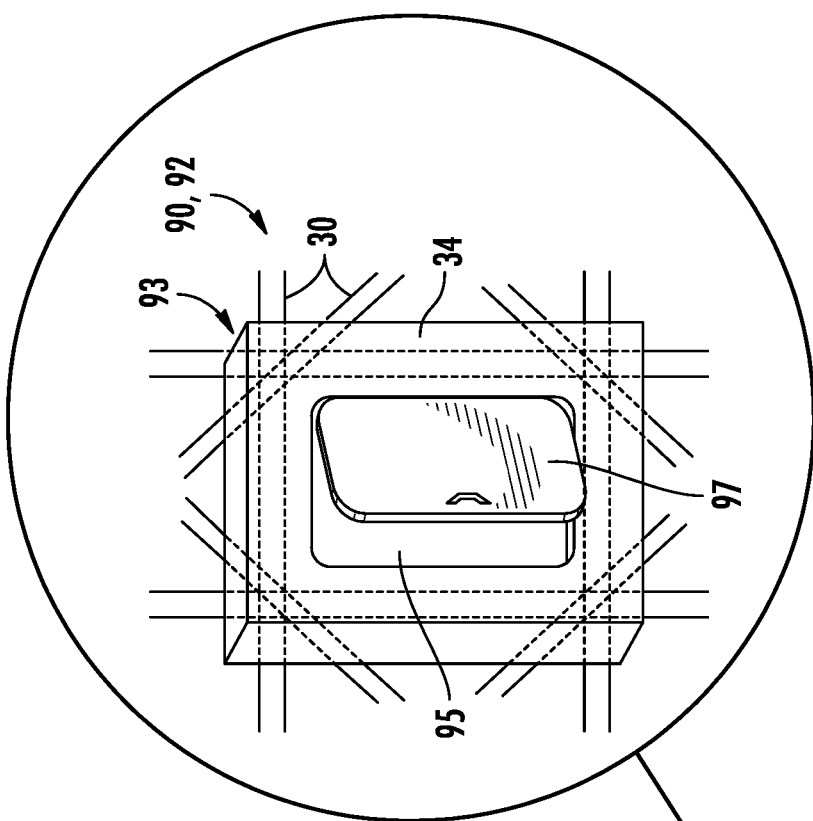
FIG. 7 illustrates a perspective view of an additively-manufactured structure having a pre-fabricated door assembly integrated therewith according to conventional construction.
Figure 7:
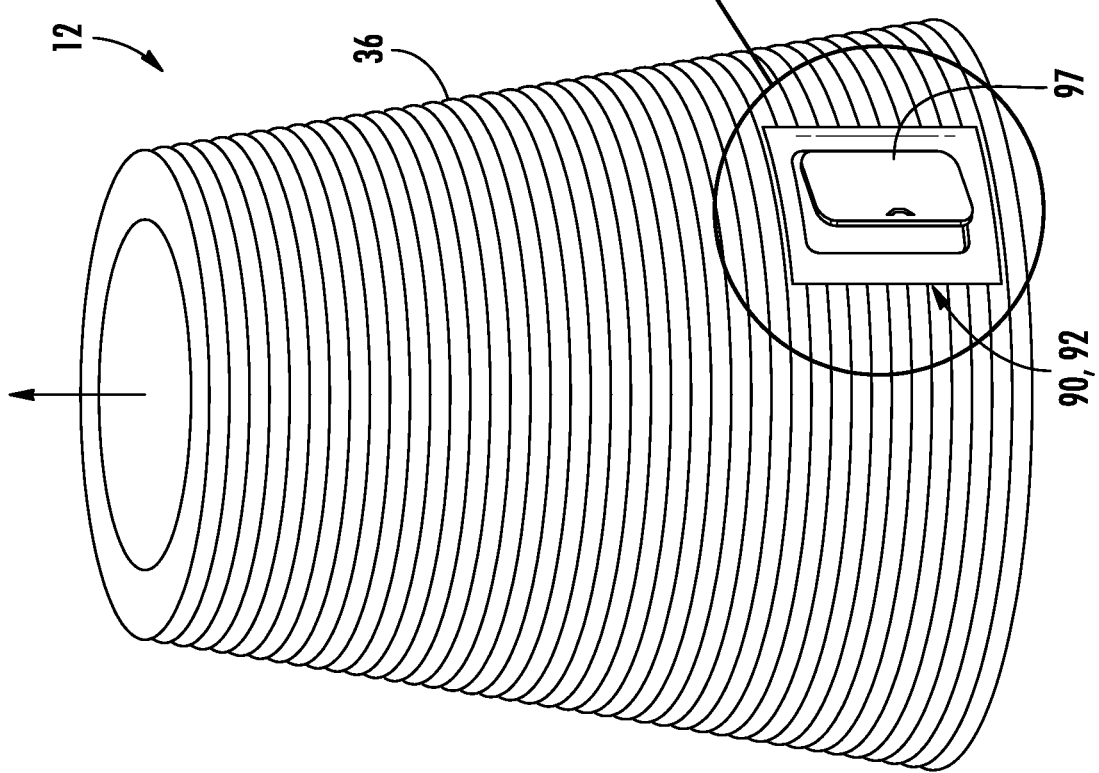

Referring now to FIG. 7, a perspective view of an embodiment of an additively-manufactured structure 12 having an access opening 17 with a pre-fabricated component(s) 90 formed therein is illustrated. The pre-fabricated component(s) 90 described herein may include any suitable pre-fabricated component formed in a number of ways. For example, in particular embodiments, as described in detail herein, the pre-fabricated component 90 may be a pre-fabricated door assembly 92 of the tower structure 12. In particular, as shown, the pre-fabricated door assembly 92 has a door frame 93 defining an access opening 95 and a door for moving between an open position that exposes the access opening 95 and a closed position that covers the access opening 95. In such embodiments, as shown in the inset of FIG. 7, the reinforcement members 30 are arranged within the composite material 34 around the access opening 95. More particular, in certain embodiments, as shown, the reinforcement members 30 may be arranged within the composite material 34 at a plurality of different angles with respect to the access opening 95.

In certain embodiments, the pre-fabricated door assembly 92 is derived/produced by position or printing a cast component (not shown) to define the access opening 95 and then depositing cementitious material within the cast component to complete production of the pre-fabricated door assembly 92. In such embodiments, the cast component is an integral part of the pre-fabricated door assembly 92 and is left permanently embedded in the tower structure 12 as the tower structure 12 is built up. In particular, in certain embodiments, the cast component for the pre-fabricated door assembly 92 may be formed of a different material composition than the composition of the material introduced into the cast component for completing the pre-fabricated door assembly 92 or used for printing the remainder of the tower structure 12.

Figure 8:
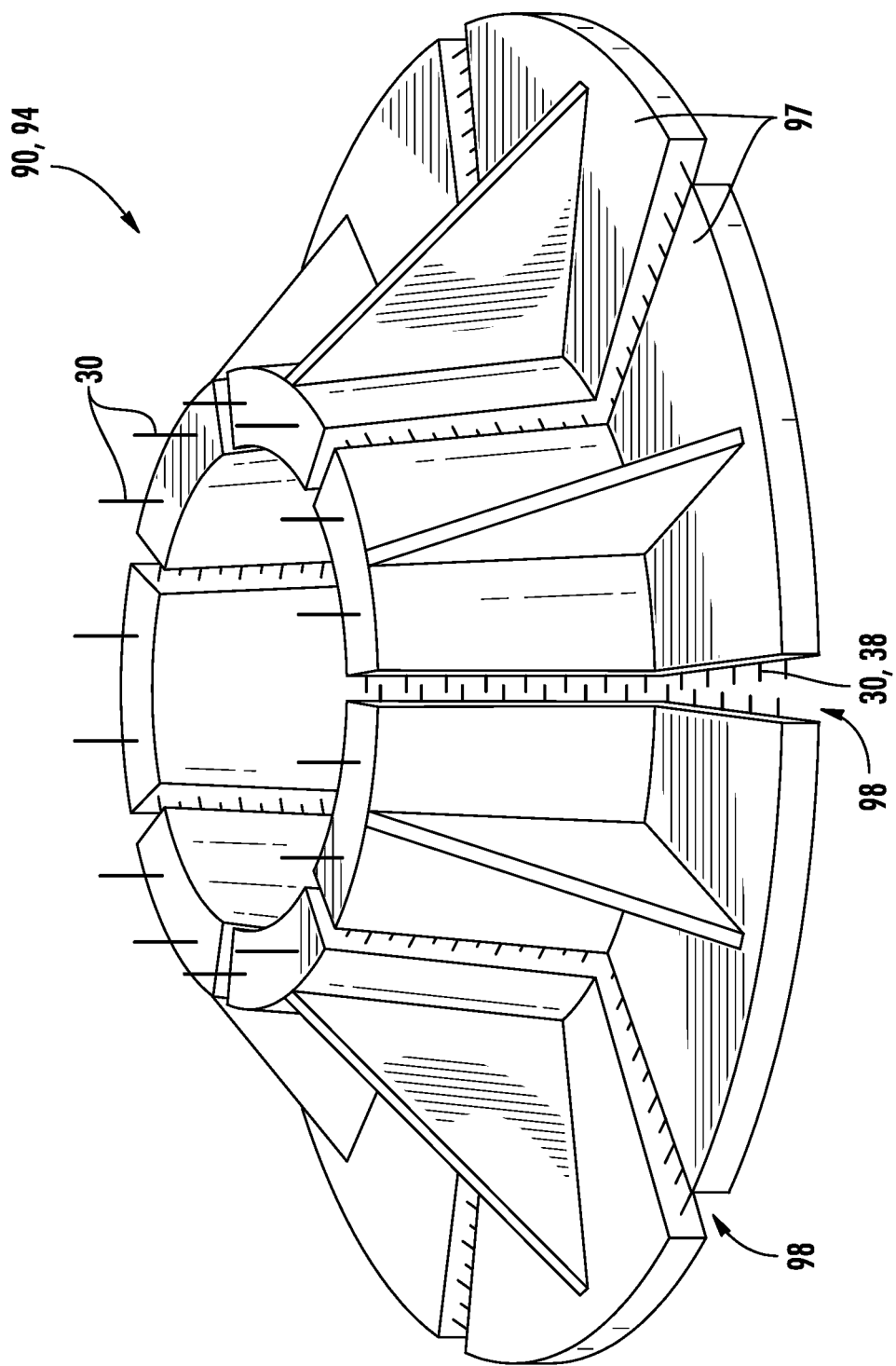
FIG. 8 illustrates a perspective view of a pre-fabricated foundation assembly according to conventional construction.

Referring now to FIG. 8, as mentioned, the pre-fabricated component 90 may also be a pre-fabricated foundation assembly 94. Further, as shown, the pre-fabricated foundation assembly 94 may include a plurality of foundation segments 97. Thus, in certain embodiments, the method of the present disclosure may include arranging the plurality of foundation segments 97 together to form a foundation of the tower structure 12. In such embodiments, as shown, a gap 98 exists between each of the plurality of foundation segments 97 with the portions 38 of the reinforcement members 30 protruding from the foundation segments 97 within the gaps 98. Moreover, in certain embodiments, the pre-fabricated component 90 also is derived/produced by position or printing a cast component (not shown). In particular, in certain embodiments, the cast component for the pre-fabricated foundation assembly 94 may include a different material composition than the composition of the material introduced into the cast component for completing the pre-fabricated foundation assembly 94 or used for printing the remainder of the tower structure 12.

As such, such pre-fabricated components 90 can be constructed prior to printing the tower structure 12 such that the components 90 can be easily incorporated therein, or the pre-fabricated components 90 can be constructed in situ during printing of the tower structure 12. For example, in an embodiment, the pre-fabricated components 90 may be formed via casting both on or off site. In alternative embodiments, the pre-fabricated components 90 may be formed via the additive printing device 40, i.e., by printing and depositing the cementitious material 28 via the printer head(s) 42 to form the pre-fabricated component 90 prior to positioning the component 90 adjacent to the support surface 15 of the tower structure 12 for printing remaining portions of the structure 12.

Figure 9:
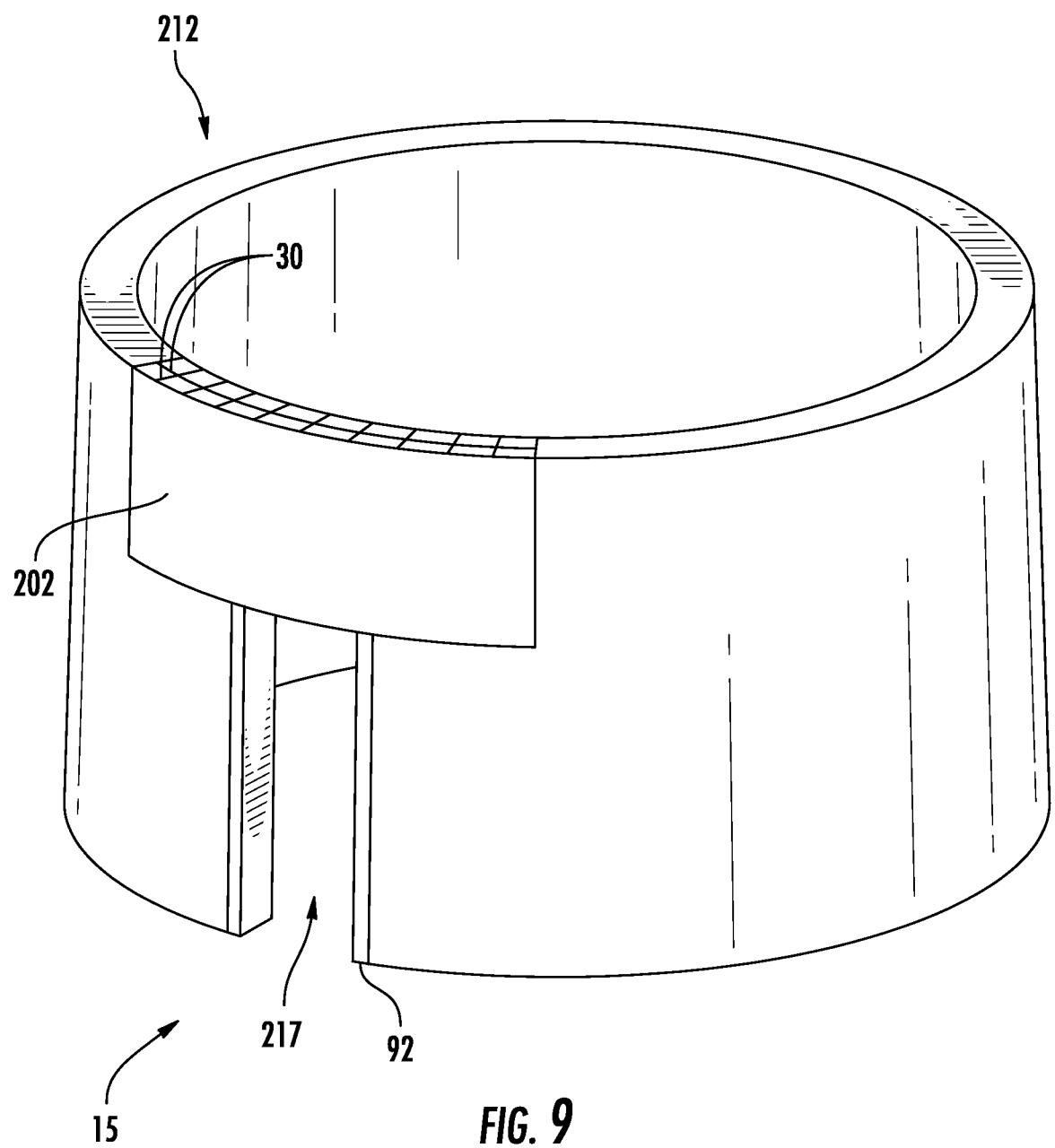
FIG. 9 illustrates a perspective view of one embodiment of an additively-manufactured structure having a reinforced access opening with a backfilled void and a pre-fabricated door assembly integrated therewith and formed using methods according to the present disclosure.
Figure 10:
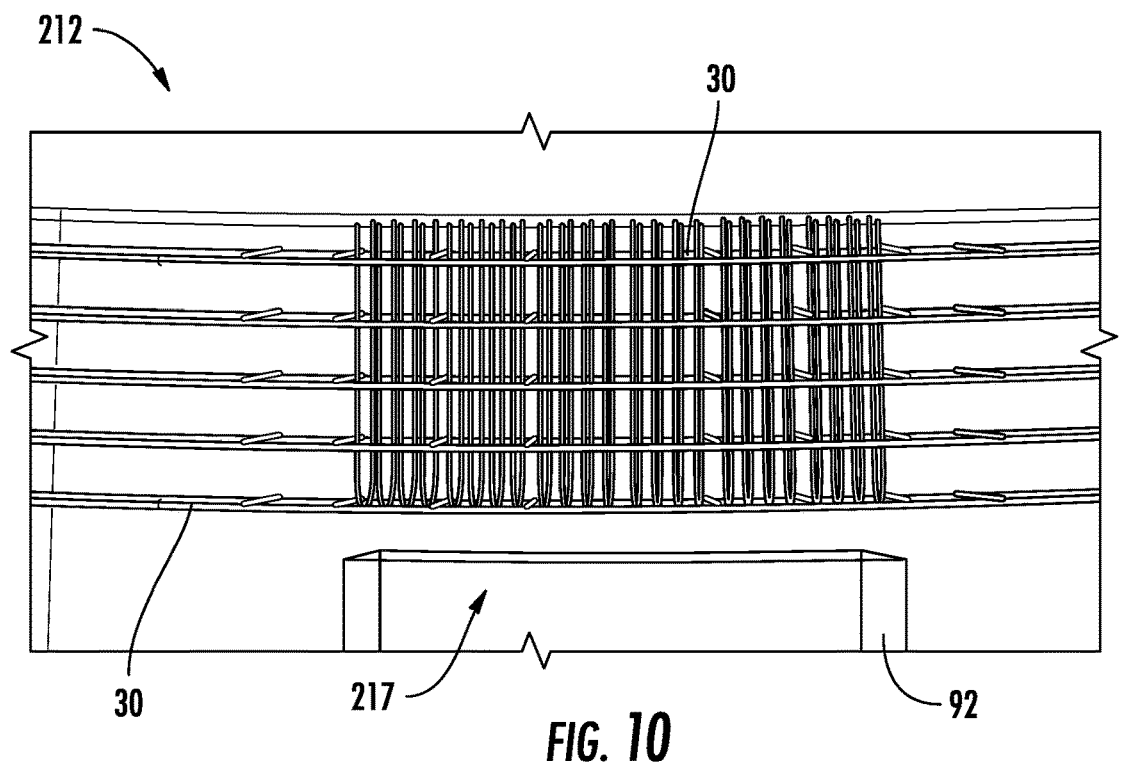
FIG. 10 illustrates a front view of the reinforcement member grid extending across and through the backfilled void of the additively-manufactured structure of FIG. 9.
Figure 11:
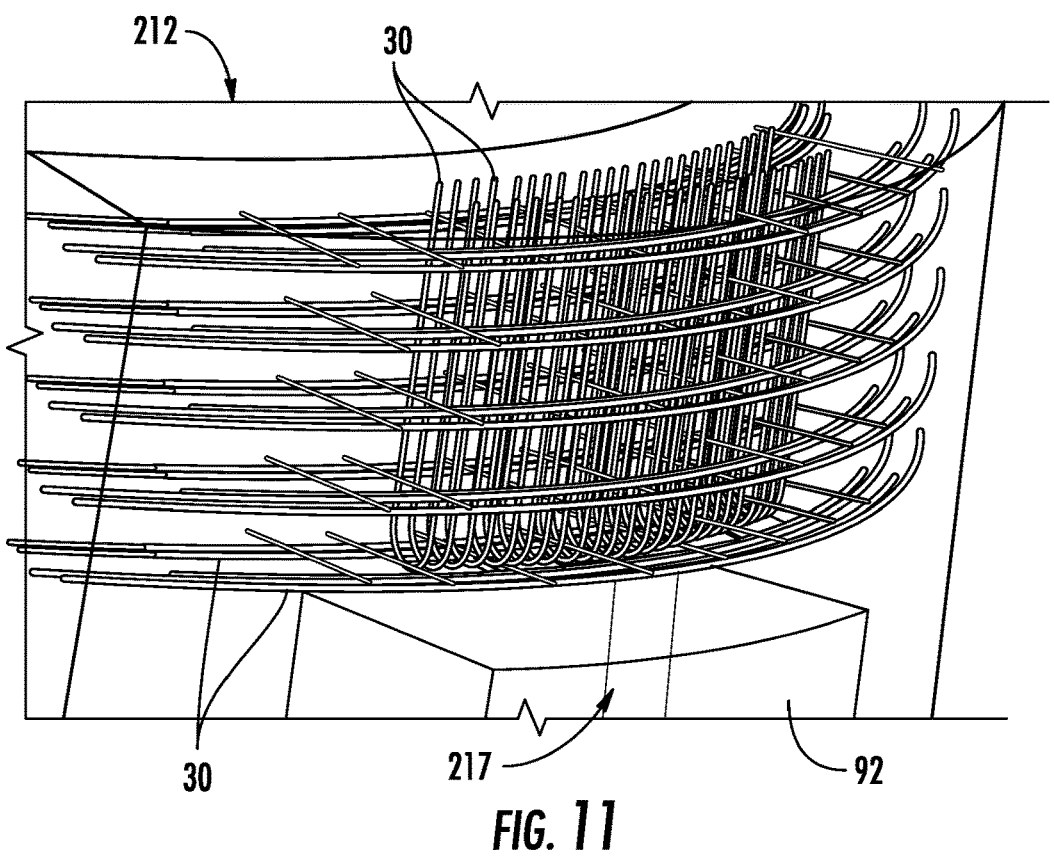
FIG. 11 illustrates a perspective view of the reinforcement member grid extending across and through the backfilled void of the additively-manufactured structure of FIG. 9.
Figure 13:
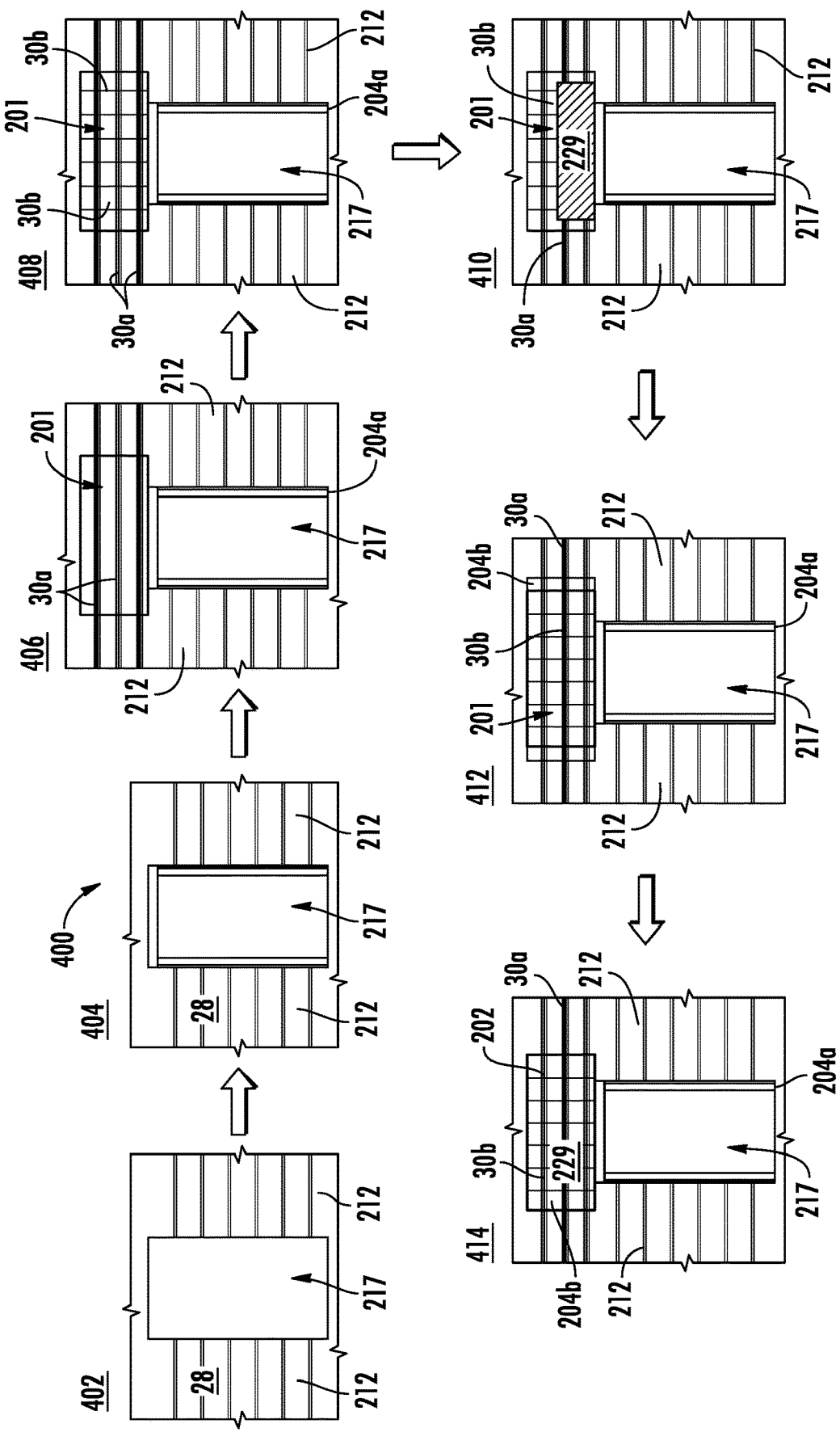
FIG. 13 illustrates a schematic diagram of one embodiment of a sequence by which the tower structure of FIGS. 9-11 is manufactured.
Figure 15:
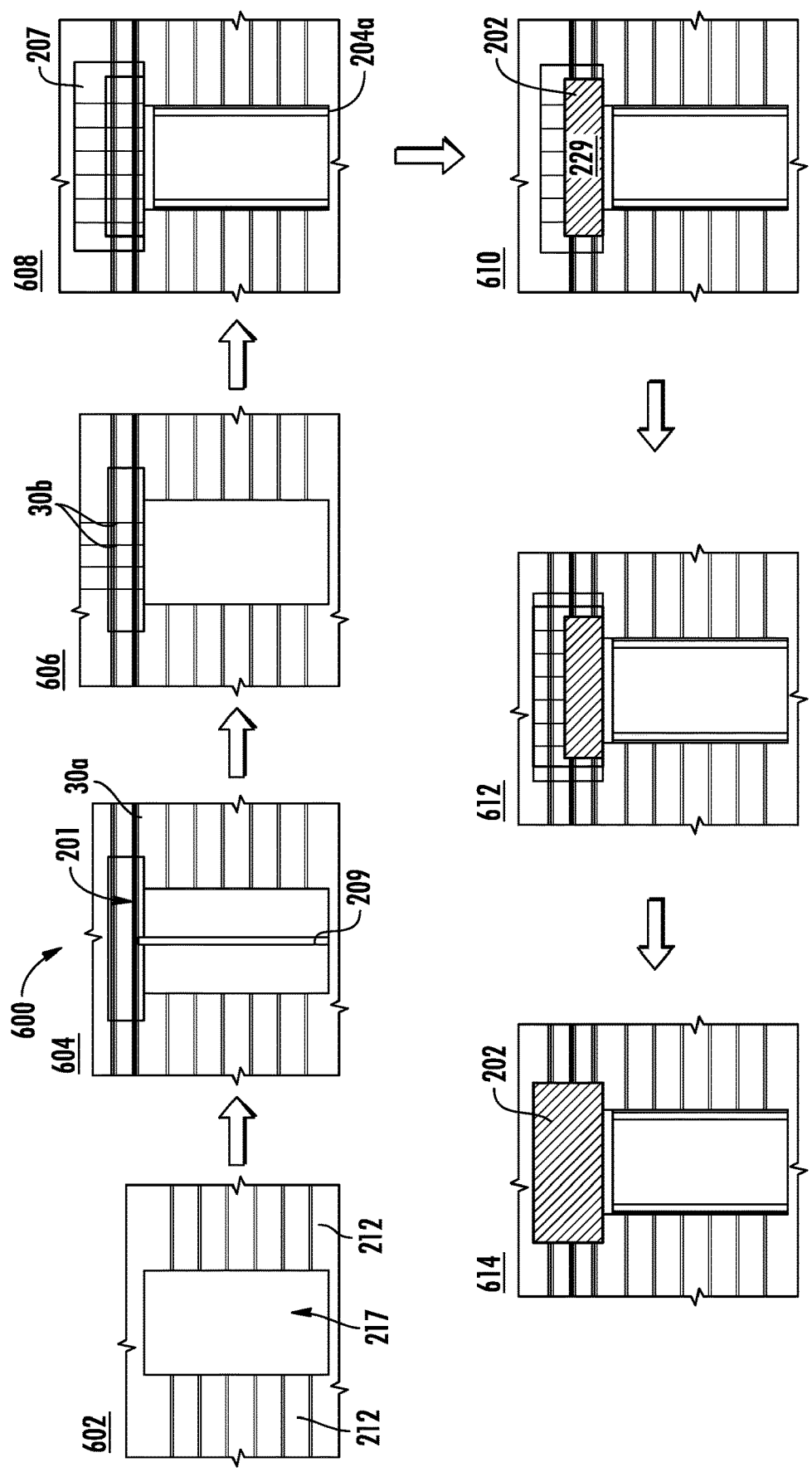
FIG. 15 illustrates a schematic diagram of yet another embodiment of a sequence by which the tower structure of FIGS. 9-11 is manufactured.

Referring now to FIGS. 9-11, illustrated is an embodiment of an additively-manufactured structure 212 having a reinforced access opening 217 with a backfilled void 202 and a pre-fabricated door assembly 92 according to the present disclosure. The backfilled void 202 described herein may include any suitable backfilled void 202 formed in a number of ways. For example, in a particular embodiment, as shown in FIGS. 13 and 15, the backfilled void 202 may be formed all at once by forming/building up the tower structure 12 to define a void 201 and leaving the void 201 to be backfilled with the help of one-piece formwork 204, for example, and then backfilling the void 201 all at once after the one or more reinforcement members 30 are placed into/through the void 201.

Figure 14:
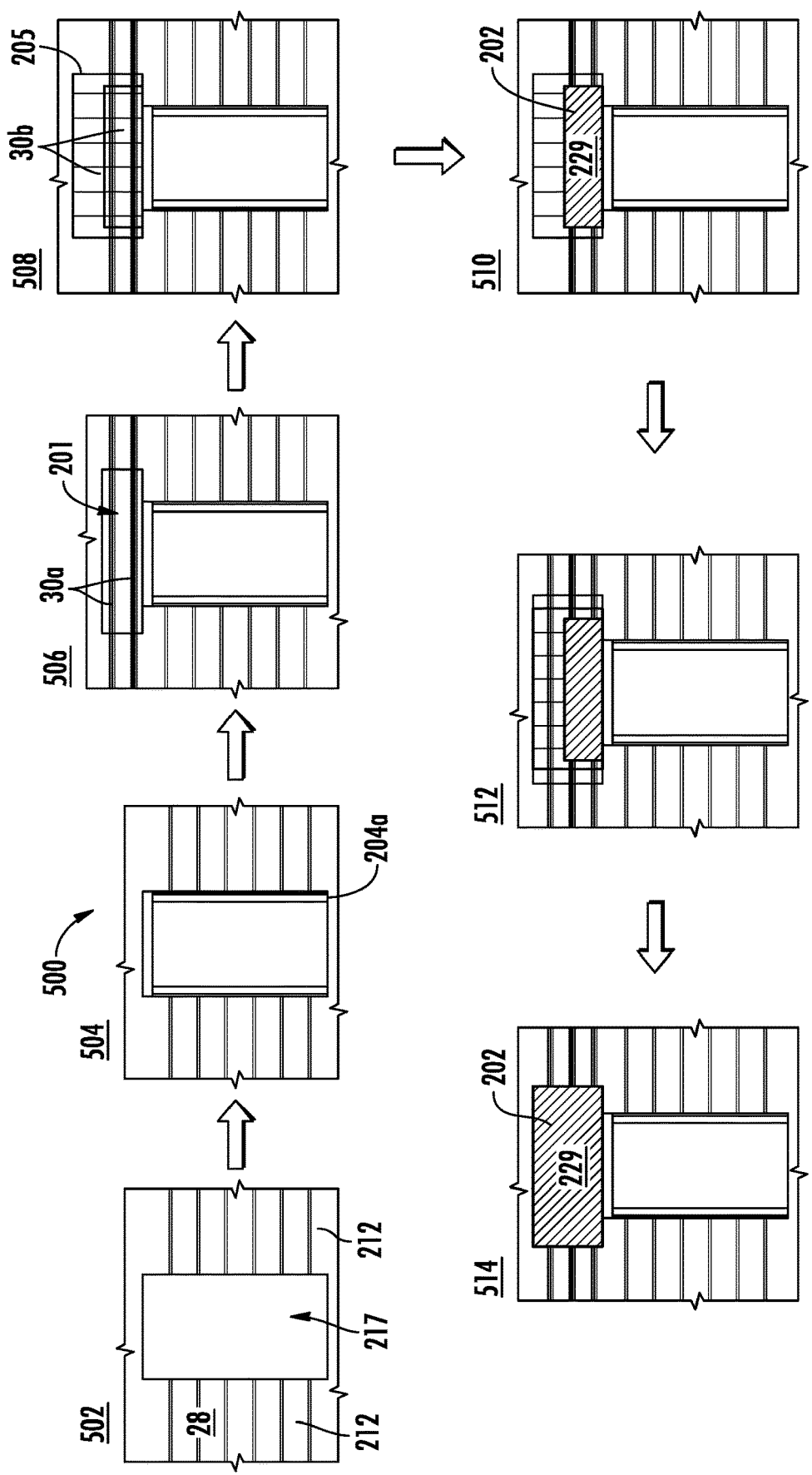
FIG. 14 illustrates a schematic diagram of another embodiment of a sequence by which the tower structure of FIGS. 9-11 is manufactured.
Figure 16:
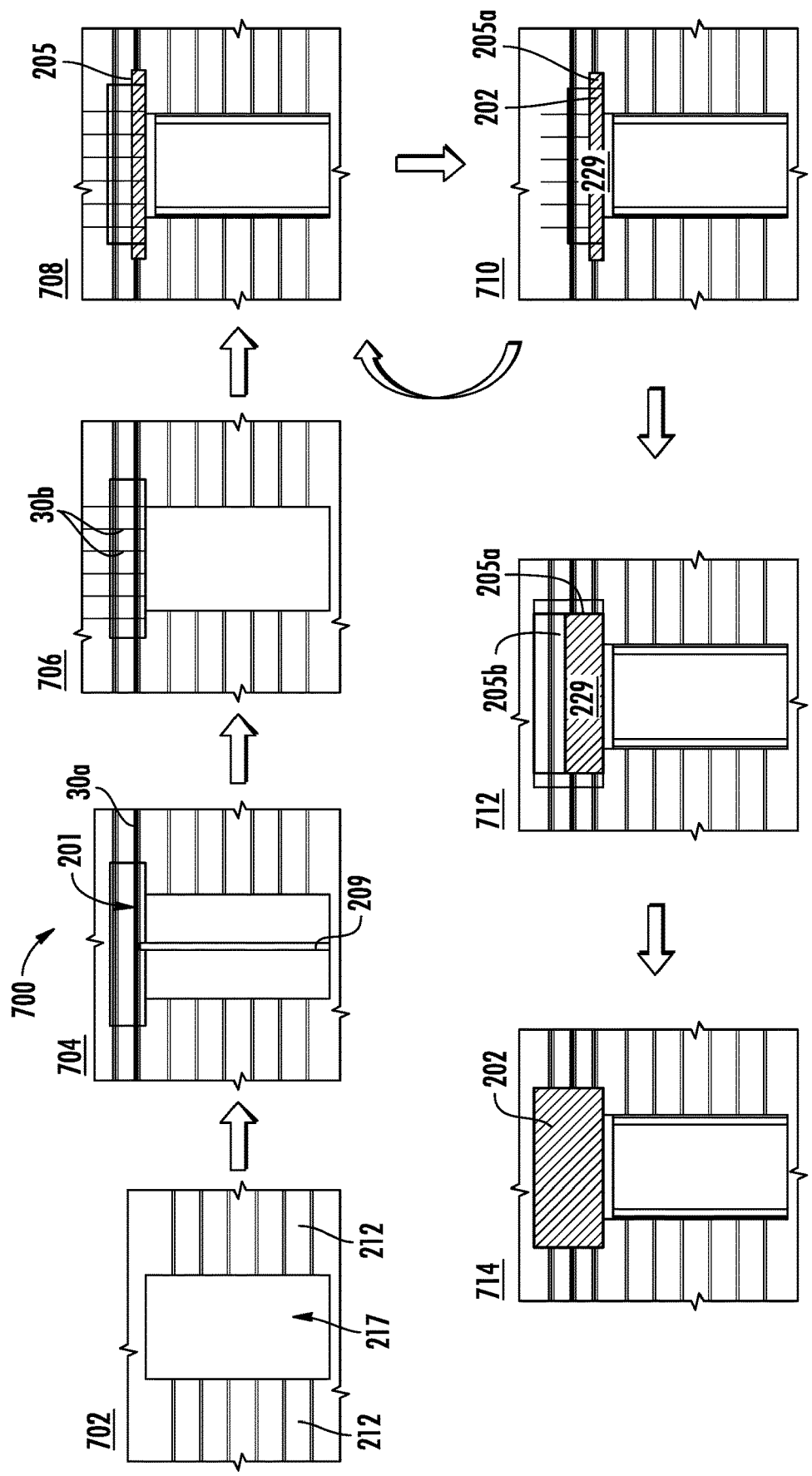
FIG. 16 illustrates a schematic diagram of still another embodiment of a sequence by which the tower structure of FIGS. 9-11 is manufactured.

In another embodiment, as shown in FIGS. 14 and 16, the backfilled void 202 may be formed incrementally with continuous or near continuous forming of the tower structure 12, continuous or near continuous expansion of the void 201 from the backfilled void 202 portion, and continuous or near continuous backfilling of the expanded void 201 via stackable formwork 205, for example. As such, in certain embodiments, the backfilled void 202 is not formed all at once but instead is formed continuously or near continuously during continuous or near continuous printing of the tower structure 12, which helps to prevent or significantly reduce cold joint formation between the older backfilled void 202, the newer backfilled void 202, and the surrounding tower structure 12. In a different embodiment, and as mentioned herein in detail, the backfilled void 202 may be formed by position or printing a printed formwork (not shown) to define the void 201 and then depositing cementitious material to complete production of the printed formwork such that it can be used for completing production of the backfilled void 202. As such, in certain embodiments, the formwork 204 remains an integral part of the tower structure 12 even after the void 201 is backfilled and, therefore, the formwork 204 is left permanently embedded in the tower structure 12 as the tower structure 12 is built up.

Moreover, and still referring to FIGS. 9-11, the portions of the reinforcement members 30 protruding from the pre-fabricated door assembly 92, and the portions of the reinforcement members 30 extending across the backfilled void 202 are configured to reinforce the cementitious material around the access opening 217. In certain embodiments, as shown in FIGS. 9-11, the reinforcement members 30 are incorporated into the backfilled void 202 and the backfilled void is incorporated into the surrounding tower structure 12 above the access opening 217 to reinforce the access opening 217. In particular, as shown in FIGS. 10-11, the reinforcement members 30 may be arranged within the backfilled void 202 at a plurality of different angles with respect to the access opening 217. For example, in one embodiment, the reinforcement members 30 are arranged within the backfilled void 202 in a grid. In another embodiment, the reinforcement members 30 are extended horizontally across the void 202, and the reinforcement members 30 are extended vertically across the void 202. In another embodiment, the reinforcement members 30 may be arranged to take a plurality of different angles with respect to the access opening 217 when placed into the backfilled void 202. The reinforcement member 30 may take the form of a U-shaped reinforcement member (see e.g., FIGS. 10-11) but may also be L-shaped, T-shaped, E-shaped, etc.

Figure 12:
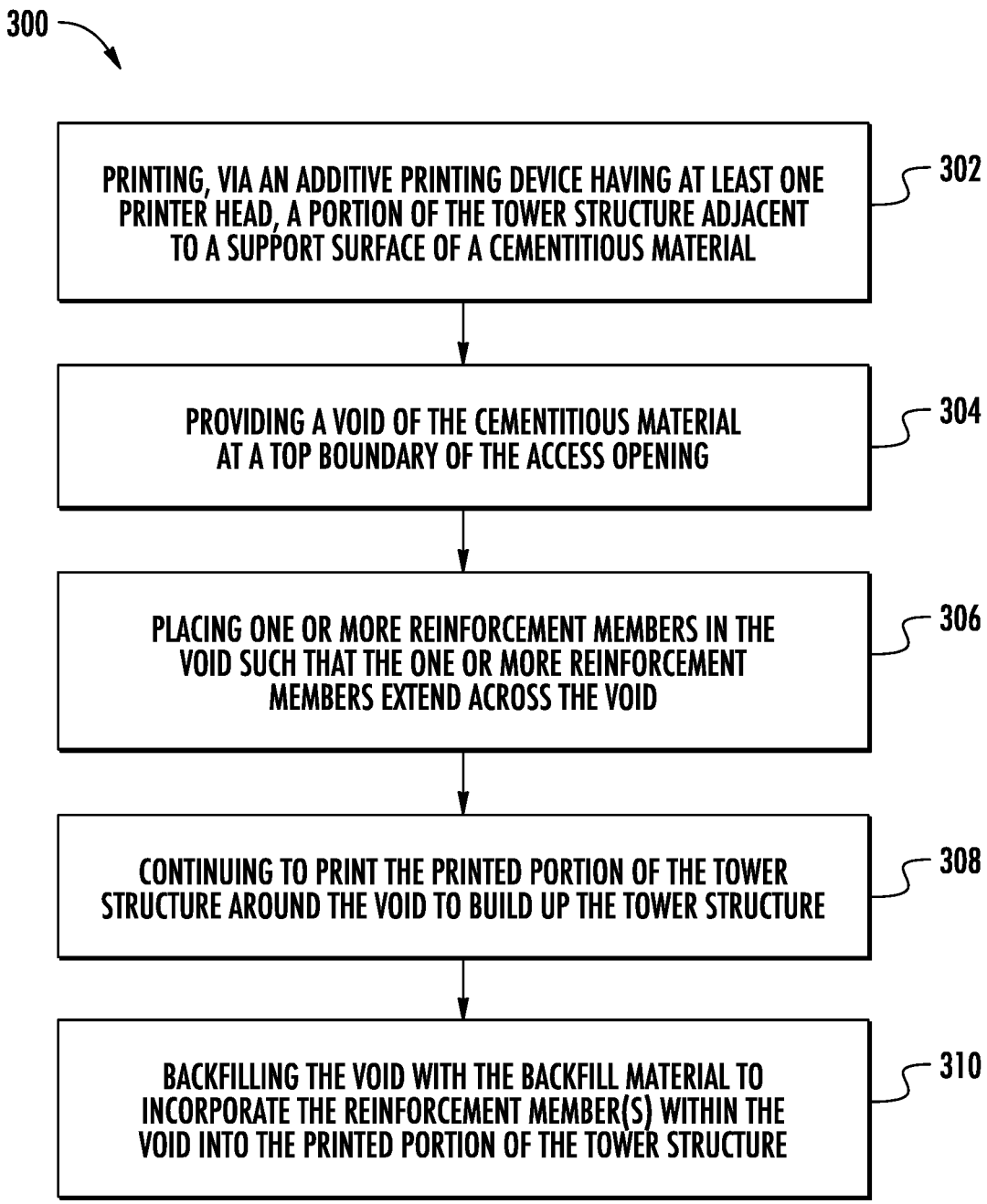
FIG. 12 illustrates a flow diagram of one embodiment of a method for manufacturing an additively-manufactured structure having a reinforced access opening according to the present disclosure.

Referring now to FIG. 12, a flow diagram of one embodiment of a method 300 for additively-manufacturing a structure with a reinforced access opening is provided. In particular, the method 300 can be used to form the tower structure 212 of FIGS. 9-11 using the additive printing device 40 of FIGS. 3-5, or to form any other suitable structure, tower, or tall structure using any other suitable additive printing device. In this regard, for example, the controller 190 of FIG. 6 may be configured for implementing the method 300. However, it should be appreciated that the method 300 is discussed herein only to describe aspects of the present disclosure and is not intended to be limiting.

Further, though FIG. 12 depicts a control method having steps performed in a particular order for purposes of illustration and discussion, those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of the methods are explained with respect to the tower structure 212 and the additive printing device 40 as an example, it should be appreciated that these methods may be applied to the operation of additive printing device to form any suitable tower structure.

Furthermore, as described herein, it may be advantageous to incorporate one or more backfilled void(s) 202 into the tower structure 212 to yield a reinforced access opening 217 or any opening or aperture through or partially through the tower wall 20. Accordingly, the method 300 described herein provides a method for manufacturing a tower structure 12 that incorporates such backfilled void(s) 202. In particular, as shown at (302), the method 300 includes printing, via an additive printing device 40 having at least one printer head 42, a portion of the tower structure 212 adjacent to a support surface 15 of a cementitious material. In such embodiments, the printed portion of the tower structure 212 defines an access opening 217. For example, the additive printing device 40 of FIGS. 3-5 and one-piece formwork (see e.g., FIG. 15) or stackable formwork (see e.g., FIGS. 14 and 16), for example, can be used to complete the method 300 described herein. Thus, as previously explained, the method 300 may include positioning the vertical support structure 50 above the support surface 15 of the tower structure 212, suspending a support member from the vertical support structure 50 (such as support ring 80), and movably coupling the printer head(s) 42 to the support member.

Referring back to FIG. 12, and as shown at (304), the method 300 also includes providing a void 201 of the cementitious material at a top boundary of the access opening 17. The void 201 may be formed all at once by forming/building up the tower structure 12 to define the entire intended void 201 and leaving the void 201 to be backfilled with the help of one-piece formwork 204, for example. The void 201 also may be formed incrementally by continuous or near continuous expansion of the void 201, and continuous or near continuous printing of the tower structure 212 around the void 201 and defining the expanding void 201, for example, such that the void 201 has older and newer defined space. The void 201 also may be formed by position or printing a printed formwork (not shown) to define the void 201, such that the formwork 204 remains an integral part of the tower structure 212 and is left permanently embedded in the tower structure 212 as the tower structure 212 around the void 201 and defining the void 201 is built up. In certain embodiments, the void 201 may be provided before positioning any pre-fabricated component(s) 90, significant formwork 204, or cast component(s) (not shown) (see e.g., FIG. 15). In other embodiments, the void 201 may be provided before positioning any significant formwork 204 or cast component(s) (not shown), but after positioning of any pre-fabricated component(s) 90 (see e.g., FIG. 14). In some embodiments, the entire intended void 201 may be provided only after positioning of the pre-fabricated component(s) 90, any significant formwork 204, or cast component(s) (not shown) (see e.g., FIG. 16).

Referring back to FIG. 12, as shown at (306), the method 300 also includes placing one or more reinforcement members 30 in the void 201 such that the one or more reinforcement members 30 extend across the void 201. In particular, the one or more reinforcement members 30 may be arranged within the void 201, i.e., prior to the void 201 being backfilled or during continuous or near continuous backfilling of the void 201—at a plurality of different angles. For example, in one embodiment, the reinforcement member(s) 30 are arranged within the void 201 in a grid. In another embodiment, the reinforcement member(s) 30 are extended horizontally across the void 202, and the reinforcement members(s) 30 are extended vertically across the void 202. In another embodiment, the reinforcement member(s) 30 may be arranged to take a plurality of different angles with respect to the access opening 217 when placed into the backfilled void 202. Depending on the embodiment, the form, shape, and structure of the reinforcement member(s) 30 (e.g., U-shaped, L-shaped, T-shaped, E-shaped), and depending on the presence of pre-fabricated component(s) 90, any significant formwork 204, or cast component(s) prior to (306), the method 300 at (306) may include placing the reinforcement member(s) 30 in the void 201 and extending the one or more reinforcement members in the void in whatever direction is not obstructed by either the pre-fabricated component(s) 90, the formwork 204, or the cast component(s) (see e.g., FIGS. 13-16).

As shown at (308), the method 300 also includes continuing to print the printed portion of the tower structure 212 around the void 201 to build up the tower structure 201. The additive printing device 40 of FIGS. 3-5 and the one-piece formwork (see e.g., FIG. 15) or the stackable formwork (see e.g., FIGS. 14 and 16), for example, may be used.

As shown at (310), the method 300 also includes backfilling the void 201 with the backfill material 229 to incorporate the reinforcement member(s) within the void 201 into the printed portion of the tower structure 212. In particular, in an embodiment, (310) may include depositing or backfilling, via the additive printing device 40, for example, a backfill material 229 into the currently available void 201 of the tower structure 212. Again, and for example, the additive printing device 40 of FIGS. 3-5 and one-piece formwork (see e.g., FIG. 15) or stackable formwork (see e.g., FIGS. 14 and 16), for example, can be used. "Currently available void" as used herein refers to continuous or near continuous manufacturing situations to distinguish between the older backfilled void 202, which is void 201 that has been backfilled earlier in time and prior to the continued expansion of the void 201—and the newer backfilled void 202—which is void 201 that has been backfilled later in time after the continued expansion of the void 201. Therefore, and returning to (310) of method 300, the backfilled void 202 may be formed by backfilling the currently available void 201 all at once after the reinforcement member(s) 30 are placed into/through the currently available void 201.

In another embodiment, the backfilled void 202 may be formed incrementally with (1) continuous or near continuous forming of the tower structure 12, (2) continuous or near continuous expansion of the void 201 (from what may have be currently available for backfilling earlier in time, or from what may have been backfilled earlier in time), and (3) continuous or near continuous backfilling of the expanded void 201 beyond what was the previous currently available void 201, which helps to prevent or significantly reduce cold joint formation between the older backfilled void 202, the newer backfilled void 202, and the surrounding tower structure 12.

Referring now to FIG. 13, a schematic diagram of an embodiment of a sequence 400 by which the tower structure of FIGS. 9-11 is manufactured is illustrated. As shown at (402) of the sequence 400, a portion of the tower structure 212 is printed of a cementitious material 28 to define the access opening 217. Next, as shown at (404) of sequence 400, a formwork 204a is positioned and installed along the printed portion of the tower structure 212 defining the access opening 217.

As shown at (406) of sequence 400, a void 201 of the cementitious material 28 is provided at a top boundary of the access opening 217 by continuing to print the tower structure 212 up above the top boundary of the access opening 217 and the formwork 204a. Also, as shown at (406) of sequence 400, one or more reinforcement members 30a—the same horizontal full ring rebar reinforcement members 30a incorporated and part of the printed portions of the tower structure 212—are extended across the void 201 and, therefore, remain placed in the void 201 such that the one or more reinforcement members 30a extend horizontally across the void 201. Also, as shown at (406) of sequence 400, the formwork 204a facilitates the continued printing of the tower structure 212 above the top boundary of the access opening 217 (by helping to support the one or more horizontal reinforcement members 30a) and facilitates the continued printing of the tower structure 212 above the top boundary of the access opening 217.

Optionally, between (404) and (406) of sequence 400, the sequence 400 may include placing a liner along formwork 204a at the top boundary of the access opening 217 on the inside surface of the void 201 to facilitate removal of the formwork 204a after formation of the backfilled void 202 at (414) of sequence 400.

Still referring to FIG. 13, as shown at (408) of sequence 400, one or more reinforcement members 30b are extended across the void 201 and, therefore, remain placed in the void 201 such that the one or more reinforcement members 30b extend vertically across the void 201. Also, as shown at (408) of sequence 400, the formwork 204a defines and obstructs the bottom of the void 201 and, therefore, the one or more vertical reinforcement members 30b are placed into the void 201 through the top or through the sides of the void 201, in between the one or more horizontal reinforcement members 30a, to form a grid of reinforcement members 30. Also, as shown at (408) of sequence 400, the formwork 204a facilitates formation of the backfilled void 202 of the tower structure 212 by helping to support the one or more vertical reinforcement members 30b, the additional formwork 204b, and the backfill material 229 at (414) of sequence 404.

As shown at (410) of sequence 400, a cold joint primer may also be applied to the void 201. In addition, as shown at (412) of sequence 400, a formwork 204b is positioned and installed along the open sides of void 201 of the tower structure 212, which leaves the top of the void 201 open for backfilling. Next, at (414) of sequence 400, the void 201 is backfilled with the backfill material 229 to incorporate the one or more reinforcement members 30a,b within the void 201 into the printed portion of the tower structure 212 and to form the backfilled void 202.

Referring now to FIG. 14, a schematic diagram of an embodiment of a sequence 500 by which the tower structure of FIGS. 9-11 is manufactured is illustrated. In particular, the sequence 500 involves the use of stackable formwork 205 and continuous or near continuous printing techniques. As shown at (502) of sequence 500, a portion of the tower structure 212 is printed of a cementitious material 28 to define the access opening 217. As shown at (504) of sequence 500, a formwork 204a is positioned and installed along the printed portion of the tower structure 212 defining the access opening 217.

As shown at (506) of sequence 500, a void 201 of the cementitious material 28 is provided at a top boundary of the access opening 217 by continuing to print the tower structure 212 above the top boundary of the access opening 217 and the formwork 204a, and one or more horizontal reinforcement members 30a are extended across the void 201. As shown at t (508) of sequence 500, one or more vertical reinforcement members 30b are placed and extended across the void 201 to form a grid of reinforcement members 30 with the one or more horizontal reinforcement members 30a, and a stackable formwork 205 is positioned and installed along the open sides of void 201 of the tower structure 212, but also extending above the elevation of the void 201 or the printed tower structure 212, which leaves the top of the void 201 open for backfilling, and which leaves more room for continued printing of the tower structure 212 along and above the elevation of the void 201, and which allows for expansion of the void 201.

As shown at (510) of sequence 500, a first portion of the void 201 is backfilled with the backfill material 229 to incorporate the one or more reinforcement members 30a,b within the first backfilled portion of the void 201 into the printed portion of the tower structure 212 and to form at least a portion of the backfilled void 202. As shown at (512) of sequence 500, the stackable formwork 205 facilitates the continuous or near continuous printing of the tower structure 212 above the top boundary of the access opening 217 and above the first backfilled portion of the backfilled void 202 to help expand the void 201, and also helps mitigate against the effects of cold joint formation. Next, as shown at (514) of sequence 500, the expanded void 201 is backfilled with the backfill material 229 to incorporate the one or more reinforcement members 30a,b within the expanded void 201 into the printed portion of the tower structure 212 and to form a second, newer portion of the backfilled void 202.

Referring now to FIG. 15, a schematic diagram of an embodiment of a sequence 600 by which the tower structure of FIGS. 9-11 is manufactured is illustrated. In particular, the sequence 600 involves the use of one piece formwork 207. As shown at (602) of sequence 600, a portion of the tower structure 212 is printed of a cementitious material 28 to define the access opening 217. As shown at (604) of sequence 600, a falsework 209 is positioned and installed within the access opening 217 to provide support for the continued printing of the printed portion of tower structure 212 above the top boundary of the access opening 217. Also, at (604) of sequence 600, the tower structure 212 above the top boundary of the access opening 217 is continued to be printed to define the void 201 such that the one or more horizontal reinforcement members 30a of the printed portion of the tower structure 212 above the top boundary of the access opening 217 extend across the void 201.

As shown at (606) of sequence 600, one or more vertical reinforcement members 30b are placed and extended across the void 201 to form a grid of reinforcement members 30 with the one or more horizontal reinforcement members 30a. As shown at (606) of sequence 600, the falsework 209 is removed. Also, as shown at (606) of sequence 600, as there is no formwork, falsework, or pre-fabricated components in the tower structure 212 to obstruct the bottom of the void 201, the one or more vertical reinforcement members 30b may be placed in the void 201 through the bottom of the void 201, in between the one or more horizontal reinforcement members 30a, to form a grid of reinforcement members 30, and fixed in placed via fixtures (see e.g., FIGS. 10-11) such that the reinforcement member grid 30 is tied in place. Also, at (606) of sequence 600, the continued printing of tower structure 212 above the top boundary of the access opening 217 and the continued formation of the void 201 are paused.

As shown at (608) of sequence 600, a formwork 204a is positioned and installed along the printed portion of the tower structure 212 defining the access opening 217, and a one piece formwork 207 is positioned and installed along the open sides of void 201 of the tower structure 212, but also extending above the elevation of the void 201 or the printed tower structure 212, which leaves the top of the void 201 open for backfilling, and which leaves more room for continued printing of the tower structure 212 along and above the elevation of the void 201.

Still referring to FIG. 15, as shown at (610) of sequence 600, the currently available void 201 is backfilled with the backfill material 229 to incorporate the one or more reinforcement members 30a,b within the backfilled portion of the currently available void 201 into the printed portion of the tower structure 212 and to form at least a portion of the backfilled void 202.

As shown at (612) of sequence 600, a cold joint primer is applied to the portion of the backfilled void 202 formed at (610). Also, as shown at (612) of sequence 600, the one piece formwork 207 facilitates the continued printing of the tower structure 212 above the top boundary of the access opening 217 and above the portion of the backfilled void 202 formed at (610) that expanded the void 201. As shown at (614) of sequence 600, the expanded void 201 is backfilled with the backfill material 229 to incorporate the one or more reinforcement members 30a,b into the printed portion of the tower structure 212, and to finish forming the backfilled void 202.

Referring now to FIG. 16, a schematic diagram of an embodiment of a sequence 700 by which the tower structure of FIGS. 9-11 is manufactured is illustrated. In particular, the sequence 700 involves the use of stackable formwork 205 and continuous or near continuous printing techniques. As shown at (702) of sequence 700, a portion of the tower structure 212 is printed of a cementitious material 28 to define the access opening 217. As shown at (704) of sequence 700, a falsework 209 is positioned and installed within the access opening 217 to provide support for the continued printing of tower structure 212 above the top boundary of the access opening 217. Also, as shown at (704) of sequence 700, the tower structure 212 above the top boundary of the access opening 217 is continued to be printed to define the void 201 such that the one or more horizontal reinforcement members 30a of the printed portion of the tower structure 212 above the top boundary of the access opening 217 extend across the void 201.

As shown at (706) of sequence 700, one or more vertical reinforcement members 30b are placed and extended across the void 201 to form a grid of reinforcement members 30 with the one or more horizontal reinforcement members 30a. Also, at (706) of sequence 700, the falsework 209 is removed. Also, as shown at (706) of sequence 700, as there is no formwork, falsework, or pre-fabricated components in the tower structure 212 to obstruct the bottom of the void 201, the one or more vertical reinforcement members 30b may be placed in the void 201 through the bottom of the void 201, in between the one or more horizontal reinforcement members 30a to form the grid of reinforcement members 30. Also, as shown at (706) of sequence 700, the continued printing of tower structure 212 above the top boundary of the access opening 217 and the continued formation of the void 201 are paused.

As shown at (708) of sequence 700, a formwork 204a is positioned and installed along the printed portion of the tower structure 212 defining the access opening 217, and a first piece of stackable formwork 205a is positioned and installed along at least a portion of the open sides of void 201 of the tower structure 212, which leaves the top of the void 201 open for backfilling, and which leaves more room for continued backfilling of the void 201 above the elevation of the first piece of stackable formwork 205a and for continued formation of the backfilled void 202.

As shown at (710) of sequence 700, a first portion of void 201 is backfilled with the backfill material 229 to incorporate the one or more reinforcement members 30a,b within the first backfilled portion of the void 201 into the printed portion of the tower structure 212 and to form at least a portion of the backfilled void 202. In addition, there may be a loop as needed between (710) and (708), wherein a second piece of stackable formwork 205b (and so on and so forth) is positioned and stacked above the first piece of stackable formwork 205b, along the void 201 of the tower structure 212, which leaves the top of the void 201 open for backfilling, and which leaves more room for continued backfilling of the void 201 above the elevation of the first piece of stackable formwork 205a and for continued formation of the backfilled void 202, and then a second portion of void 201 is backfilled with the backfill material 229 to incorporate the one or more reinforcement members 30a,b into the printed portion of the tower structure 212.

As shown at (712) of sequence 700, a depending on the number of loops between (708) and (710) needed, the stackable formwork 205 facilitates the continuous or near continuous printing of the tower structure 212 above the top boundary of the access opening 217 and above the first and second backfilled portion of the backfilled void 202 to help expand the void 201, and also to help mitigate against the effects of cold joint formation. Also, as shown at (712) of sequence 600, a cold joint primer may be applied to the portion(s) of the backfilled void 202 formed during the loop between (708) and (710). As shown at (714) of sequence 700, the expanded void 201 is backfilled with the backfill material 229 to incorporate the one or more reinforcement members 30a,b into the printed portion of the tower structure 212, and to finish forming the backfilled void 202.

Figure 17:
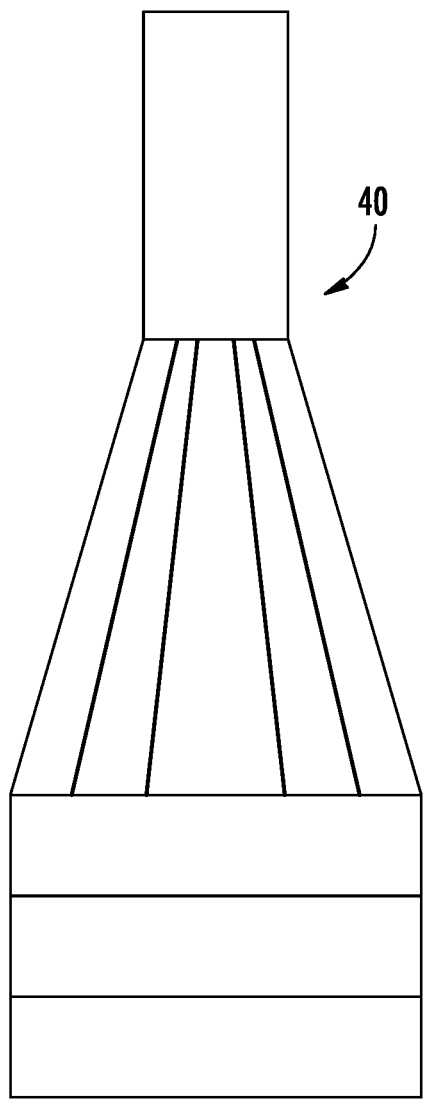
FIG. 17 illustrates a simplified front view of an embodiment of an additive printing device having a variable width printer head that may be used to print the tower structures described herein according to the present disclosure.
Figure 18:
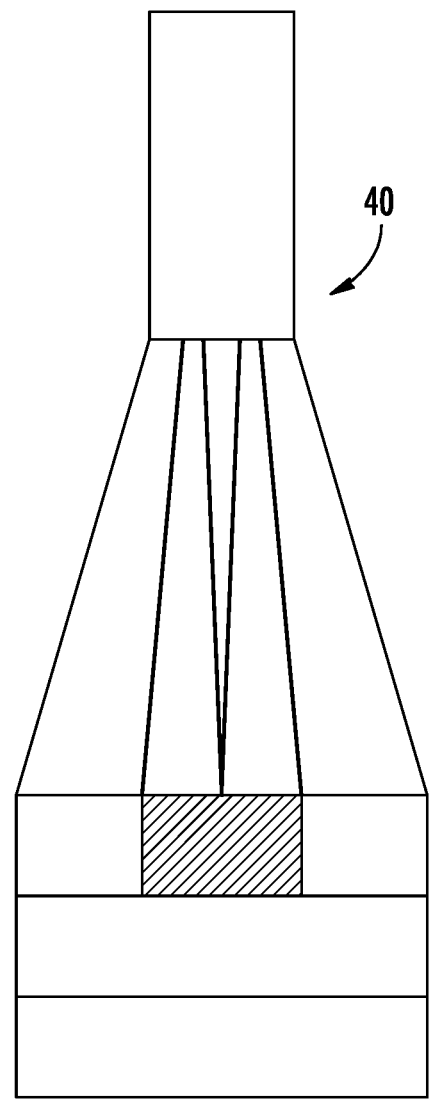
FIG. 18 illustrates a simplified front view of another embodiment of an additive printing device having a variable width printer head that may be used to print the tower structures described herein according to the present disclosure.

Referring now to FIGS. 17-18, provided are two simplified front views of an additive printing device having a printer head 40 having a variable width printer nozzle 41, also known as a variable width printer head, that may be used to print the structures of FIGS. 9-11, in particular, to print a gap or void for the tower structure, according to the present disclosure.

Further aspects of the invention are provided by the subject matter of the following clauses:

Clause 1. A method of additively-manufacturing a structure having a reinforced access opening, the method comprising:
printing, via an additive printing device having at least one printer head, a portion of the structure adjacent to a support surface of a cementitious material, the printed portion of the structure defining an access opening;
providing a void of the cementitious material at a top boundary of the access opening;
placing one or more reinforcement members in the void such that the one or more reinforcement members extend across the void;
continue printing the printed portion of the structure around the void to build up the structure; and
backfilling the void with a backfill material to incorporate the one or more reinforcement members within the void into the printed portion of the structure.

Clause 2. The method of clause 1, wherein the at least one printer head is a variable width printer head, the method further comprising adjusting the variable width printer head to provide, at least in part, the void at the top boundary of the access opening.

Clause 3. The method of claim 1, further comprising positioning a pre-fabricated door assembly defining the access opening adjacent to the support surface before printing the portion of the structure, then printing the portion of the structure around the pre-fabricated door assembly such that the printed portion of the structure comprises the pre-fabricated door assembly.

Clause 4. The method of any of the preceding clauses, wherein printing the portion of the structure defining the access opening comprises positioning formwork or a cast component to define the access opening before printing the portion of the structure, then printing the portion of the structure defining the access opening, at least in part, along the formwork or the cast component.

Clause 5. The method of clause 4, wherein providing the formwork or the cast component comprises printing, via the additive printing device having the at least one printer head, the formwork, or the cast component adjacent to the support surface to define the access opening.

Clause 6. The method of any of the preceding clauses, wherein printing the portion of the structure comprises printing a base portion of the structure below the access opening by placing one or more ring-shaped reinforcement members atop the support structure and printing one or more layers of the cementitious material upon the one or more ring-shaped reinforcement members.

Clause 7. The method of any of the preceding clauses, wherein printing the portion of the structure comprises printing a door sub-portion by printing one or more walls of the cementitious material to define a boundary of the access opening, and wherein continuing to print the printed portion of the structure around the void to build up the structure comprises placing one or more ring-shaped reinforcement members above the void and printing one or more layers of the cementitious material upon the one or more ring-shaped reinforcement members.

Clause 8. The method of any of the preceding clauses, wherein the at least one printer head comprises a variable-width printer nozzle, wherein providing the void of the cementitious material at the top boundary of the access opening comprises:
printing, via the variable-width printer nozzle, one or more layers of the portion of the structure with the void formed therebetween.

Clause 9. The method of any of the preceding clauses, wherein providing the void of the cementitious material at the top boundary of the access opening comprises:
providing the formwork or the cast component at the top boundary of the access opening to define the void adjacent to the access opening; and
continue printing the printed portion of the structure around the formwork or the cast component at the top boundary of the access opening.

Clause 10. The method of clause 9, wherein providing the formwork or the cast component comprises printing, via the additive printing device having the at least one printer head, the formwork, or the cast component to define the void adjacent to the access opening.

Clause 11. The method of any of the preceding clauses, wherein placing the one or more reinforcement members in the void comprises arranging a plurality of reinforcement members in a grid pattern within the void.

Clause 12. The method of clause 11, wherein arranging the plurality of reinforcement members in the grid pattern within the void comprises horizontally extending the plurality of reinforcement members across the void and vertically extending the plurality of reinforcement members across the void.

Clause 13. The method o of any of the preceding clauses, wherein placing the one or more reinforcement members in the void comprises horizontally extending the one or more reinforcement members across the void and extending and anchoring load-bearing suspension cables across the void.

Clause 14. A structure, comprising:
a support surface;
a printed portion formed from a cementitious material adjacent to the support surface, the printed portion comprising a pre-fabricated door assembly to define, at least in part, an access opening; and
a backfilled void at a top boundary of the access opening, the backfilled void comprising backfilled cementitious material, the backfilled void comprising one or more reinforcement members embedded within the backfilled cementitious material and extending across the backfilled void such that the one or more reinforcement members are incorporated into the printed portion of the structure.

Clause 15. The structure of clause 14, further comprising a cast component at the top boundary of the access opening defining, at least in part, the backfilled void.

Clause 16. The structure of any of clause 14-15, further comprising a base portion comprises one or more layers of cementitious material and one or more ring-shaped reinforcement members.

Clause 17. The structure of any of clause 14-16, wherein the printed portion of the structure comprises at least two walls formed of the cementitious material and adjacent to and supporting the pre-fabricated door assembly.

Clause 18. The structure of any of clause 14-17, wherein the backfilled void comprises a plurality of reinforcement members arranged in a grid pattern.

Clause 19. The structure of any of clause 14-18, wherein the plurality of reinforcement members arranged in the grid pattern comprises horizontally extending reinforcement members and vertically extending reinforcement members across the void.

Clause 20. The structure of any of clause 14-19, wherein the backfilled void comprises horizontal reinforcement members and one or more anchored load-bearing suspension cables.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of additively-manufacturing a structure having a reinforced access opening, the method comprising:
   printing, via an additive printing device having at least one printer head, a portion of the structure adjacent to a support surface of a cementitious material, the printed portion of the structure defining an access opening;
   providing a void of the cementitious material at a top boundary of the access opening;
   placing one or more reinforcement members in the void such that the one or more reinforcement members extend across the void;
   continue printing the printed portion of the structure around the void to build up the structure; and
   backfilling the void with a backfill material to incorporate the one or more reinforcement members within the void into the printed portion of the structure.

2. The method of claim 1, wherein the at least one printer head is a variable width printer head, the method further comprising adjusting the variable width printer head to provide, at least in part, the void at the top boundary of the access opening.

3. The method of claim 1, further comprising positioning a pre-fabricated door assembly defining the access opening adjacent to the support surface before printing the portion of the structure, then printing the portion of the structure around the pre-fabricated door assembly such that the printed portion of the structure comprises the pre-fabricated door assembly.

4. The method of claim 1, wherein printing the portion of the structure defining the access opening comprises positioning formwork or a cast component to define the access opening before printing the portion of the structure, then printing the portion of the structure defining the access opening, at least in part, along the formwork or the cast component.

5. The method of claim 4, wherein providing the formwork or the cast component comprises printing, via the additive printing device having the at least one printer head, the formwork, or the cast component adjacent to the support surface to define the access opening.

6. The method of claim 1, wherein printing the portion of the structure comprises printing a base portion of the structure below the access opening by placing one or more ring-shaped reinforcement members atop the support structure and printing one or more layers of the cementitious material upon the one or more ring-shaped reinforcement members.

7. The method of claim 1, wherein printing the portion of the structure comprises printing a door sub-portion by printing one or more walls of the cementitious material to define a boundary of the access opening, and wherein continuing to print the printed portion of the structure around the void to build up the structure comprises placing one or more ring-shaped reinforcement members above the void and printing one or more layers of the cementitious material upon the one or more ring-shaped reinforcement members.

8. The method of claim 1, wherein the at least one printer head comprises a variable-width printer nozzle, wherein providing the void of the cementitious material at the top boundary of the access opening comprises:
   printing, via the variable-width printer nozzle, one or more layers of the portion of the structure with the void formed therebetween.

9. The method of claim 1, wherein providing the void of the cementitious material at the top boundary of the access opening comprises:
   providing the formwork or the cast component at the top boundary of the access opening to define the void adjacent to the access opening; and
   continue printing the printed portion of the structure around the formwork or the cast component at the top boundary of the access opening.

10. The method of claim 9, wherein providing the formwork or the cast component comprises printing, via the additive printing device having the at least one printer head, the formwork, or the cast component to define the void adjacent to the access opening.

11. The method of claim 1, wherein placing the one or more reinforcement members in the void comprises arranging a plurality of reinforcement members in a grid pattern within the void.

12. The method of claim 11, wherein arranging the plurality of reinforcement members in the grid pattern within the void comprises horizontally extending the plurality of reinforcement members across the void and vertically extending the plurality of reinforcement members across the void.

13. The method of claim 1, wherein placing the one or more reinforcement members in the void comprises horizontally extending the one or more reinforcement members across the void and extending and anchoring load-bearing suspension cables across the void.

\* \* \* \* \*